US012601452B2

(12) United States Patent
Chung et al.

(10) Patent No.: US 12,601,452 B2
(45) Date of Patent: Apr. 14, 2026

(54) PIPELINE INTEGRITY MONITORING SYSTEM (PIMS) FOR OIL, GAS AND OTHER PIPELINES

(71) Applicant: Avante International Technology, Inc., Princeton Junction, NJ (US)

(72) Inventors: Kevin Kwong-Tai Chung, Princeton, NJ (US); Albert Chung, Princeton, NJ (US); Yulin Huang, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 243 days.

(21) Appl. No.: 18/604,862

(22) Filed: Mar. 14, 2024

(65) Prior Publication Data

US 2024/0310004 A1 Sep. 19, 2024

Related U.S. Application Data

(60) Provisional application No. 63/452,946, filed on Mar. 17, 2023.

(51) Int. Cl.
*F17D 5/00* (2006.01)
*F17D 5/06* (2006.01)

(52) U.S. Cl.
CPC ................ *F17D 5/00* (2013.01); *F17D 5/06* (2013.01)

(58) Field of Classification Search
CPC .................................... F17D 5/00; F17D 5/06
See application file for complete search history.

(56) References Cited

U.S. PATENT DOCUMENTS 5,587,534 A * 12/1996 McColskey ............ G01N 29/07 73/598
6,561,032 B1 * 5/2003 Hunaidi ................. G01N 29/07 702/171
11,976,636 B1 5/2024 Gregory et al.
2005/0162662 A1 * 7/2005 Sauerland .......... G01B 9/02068 356/502
2011/0056298 A1 * 3/2011 O'keefe ................. G01N 29/04 73/622

(Continued)

OTHER PUBLICATIONS

Various Sources, "The Following are State-of-The-Arts Currently in the Marketplace for Pipeline Monitoring and Leakage Detections", Date prior to Mar. 17, 2023, 67 pages.

(Continued)

*Primary Examiner* — Eric S. McCall
(74) *Attorney, Agent, or Firm* — Clement A. Berard, Esq.; Dann, Dorfman, Herrell and Skillman, PC

(57) ABSTRACT

A monitoring system for a pipeline system, may comprise: thickness sensors, vibration sensors, flow sensors, leak sensors and/or other sensors disposed on pipelines, controller processors coupled to the sensors to receive and geo-tag sensor data, communication devices for transmitting geo-tagged data, and a central facility comprising: a communication device receiving the geo-tagged data and servers to analyze the data from the sensors to determine, e.g., wall thickness, vibration producing events, media flow, and/or leaks, and to compare same to standardized exception data therefor; wherein when an exception exists, to generate and communicate an alert therefrom via a display, a human interface device and/or the communication device of the central facility.

36 Claims, 7 Drawing Sheets

(56) References Cited

U.S. PATENT DOCUMENTS

| | | | | |
|---|---|---|---|---|
| 2014/0224026 | A1 | 8/2014 | Linford et al. | |
| 2014/0251480 | A1* | 9/2014 | Kulkarni | B29C 63/34 29/700 |
| 2014/0352443 | A1* | 12/2014 | Abney | G01B 21/085 73/655 |
| 2015/0185186 | A1* | 7/2015 | Han | G01N 29/045 73/579 |
| 2016/0371957 | A1 | 12/2016 | Ghaffari et al. | |
| 2020/0088686 | A1* | 3/2020 | Sinha | G01N 29/348 |
| 2022/0299477 | A1* | 9/2022 | Chang | G01F 25/00 |
| 2023/0288236 | A1 | 9/2023 | Balasubramanian et al. | |
| 2024/0329006 | A1* | 10/2024 | Tieger | G01N 29/4481 |
| 2025/0207993 | A1* | 6/2025 | Nash | G01M 3/243 |

OTHER PUBLICATIONS

By Corrview.com, "21 Types of Pipe Corrosion & Failure", Reviewed by Raghvendra Gopal, Published: Nov. 9, 2020, https://www.corrosionpedia.com/21-types-of-pipe-corrosion-failure/2/1484, Last updated: Mar. 1, 2022, 18 pages.

Avante International Technology, Inc., "ELECTROSENSOR™ Leak Detection & Locating System—CRP Series: Crude and Refined Petroleum Products Application", © 2024 (Rev. 1.0, Feb. 2024), 2 pages.

By Kenneth A. Fowler, Gerry M. Elfbaum, and Thomas J. Nelligan, "Theory and Application of Precision Ultrasonic Thickness Gaging", https://www.olympus-ims.com/en/resources/white-papers/theory-and-application-of-precious-ultrasonic-thickness-gaging/, printed Oct. 31, 2024, 13 pages.

DeFelsko, "Ultrasonic Wall Thickness Gauges", https://www.defelsko.com/product-categories/ultrasonic-wall-thickness, printed Oct. 31, 2024, 7 pages.

Huatec Group Corporation, "HUATEC 0.75mm—300.0mm measure range Ultrasonic thickness gauge , UT thickness gage TG-3300", https://www.alibaba.com/product-detail/HUATEC-0-75mm-300-0mm-Measure_1600301386472.html?spm=a2700.galleryofferlist.normal_offer.d_title.6231e7837qeuF7&s=p, printed Oct. 31, 2024, 12 pages.

By Alfonso Fernandez, "Study of Vibration", https://power-mi.com/content/study-vibration, printed 13/31/2024, 12 pages.

Propump Services, "Pump Vibration Analysis" https://www.propumpservices.com/pump-testing/pump-vibration-analysis/page.aspx?id=1016, printed Oct. 31, 2024, 2 pages.

Google, "Search—vibration sensors arduino", https://www.google.com/search?q=vibration+sensors+arduino&rlz=1C1GCEA_enUS914US914&ei=YYoPZliaLv6jptQP2fyQoAl&oq=vibration+gauge+on+arduino&gs_lcp=Cgxnd3Mtd2l6LXNIcnAQARgBMgUIABCiBDIFCAAQogQyBQgAEKIEMgUIABCiBDoECAAQRzoGCAAQHhANOgUIABCGAzoKCCEQoAEQwwQQCkoECEEYAFCXFIjIQ2DtWmgAcAJ4AIABIgGIAagPkgEEMS4xNpgBAKABAcgBCMABAQ&sclient=gws-wiz-serp, printed Oct. 31, 2024, 4 pages.

Martin Dosedel and Zdenek Havránek, "Design and performance evaluation of smart vibration sensor for industrial applications with built-in MEMS accelerometers", https://dspace.vut.cz/server/api/core/bitstreams/32aec561-ab64-4f9a-a0d7-d20c4fb814cd/content, printed Oct. 31, 2024, 8 pages.

Omega, "Practical Strain Gage Measurements", https://br.omega.com/omegaFiles/techref/pdf/StrainGage_Measurement.pdf, © Agilent Technologies 1999, printed Oct. 31, 2024, 37 pages.

Elecrow, "Strain Gauge Module", https://www.elecrow.com/strain-gauge-module-p-735.html, printed Oct. 31, 2024, 3 pages.

Google, "Search—strain gauge on arduino",https://www.google.com/search?q=strain+gauge+on+arduino&rlz=1C1GCEA_enUS914US914&oq=strain+measurement+on+&aqs=chrome.7.69i57j0i22i30l8j0i15i22i30.21052j0j15&sourceid=chrome&ie=UTF-8#ip=1, printed Oct. 31, 2024, 3 pages.

SparkFun Electronics, "SparkFun 9DoF IMU Breakout—ICM-20948 (Qwiic)", https://www.sparkfun.com/products/15335, printed Oct. 31, 2024, 6 pages.

By Thomas Kosch, "Galvanic Skin Response powered by Arduino", Published Dec. 17, 2017, https://thomaskosch.com/index.php/2017/12/17/galvanic-skin-response-powered-by-arduino/, 3 pages.

Arduino, "Require the programming of an Arduino Uno for a circuit which maintains current", https://forum.arduino.cc/t/require-the-programming-of-an-arduino-uno-for-a-circuit-which-maintains-current/186634, © 2024 Arduino, Oct. 2013, printed Oct. 31, 2024, 3 pages.

Erlich Industrial Development, Corp., "Converter—420VX—current to voltage converter (transducer) board with DIN-RAIL mounting option", https://www.eidusa.com/Interface_Boards_Current_to_voltage.htm, Copyright (c) 1996-2020, printed Oct. 31, 2024, 9 pages.

Kaifeng Instrument Co., Ltd., "TUF-2000B Ultrasonic Flow Meter ( wall-mounted converter)", https://www.kyflowmeter.com/product/detail/pro022.html, Copyright © 2019, printed Oct. 31, 2024, 4 pages.

Siemens, "Clamp-on ultrasonic flow measurement", https://www.siemens.com/us/en/products/automation/process-instrumentation/flow-measurement/ultrasonic/clamp-on.html, © Siemens 1996-2024, printed Oct. 31, 2024, 9 pages.

Badger Meter, "Ultrasonic Flow Meters", https://www.badgermeter.com/products/meters/ultrasonic-flow-meters/, printed Oct. 31, 2024, 10 pages.

JITAI Tech Detection Device Company, "JITAI KEYi—JITA 1510 Thickness Meter", © JITAI510, https://www.gongpinyun.com/index.php?ctl=Goods_Goods&met=goods&type=goods&gid=986079, No translation available to Applicant, printed Oct. 31, 2024, 31 pages.

USPTO, Office Action in U.S. Appl. No. 19/304,053, Jan. 5, 2026, 42 pages.

* cited by examiner

PIPELINE INTEGRITY MONITORING SYSTEM (PIMS) FOR OIL, GAS AND OTHER PIPELINES

This Application claims the benefit and priority of U.S. Provisional Application No. 63/452,946 filed Mar. 17, 2023, and entitled "PIPELINE INTEGRITY MONITORING SYSTEM (PIMS) FOR OIL, GAS AND OTHER PIPELINES," which is hereby incorporated herein by reference in its entirety for all purposes.

The present invention relates to a pipeline monitoring system and, in particular, to a pipeline monitoring system for pipelines and related equipment that may potentially carry various materials.

Pipelines are integral parts of the oil and gas supply chain, as well as for other materials and media. They are used extensively in up-stream operations in the transmission of crude products to refineries and depots; in mid-stream operations for transmission from refinery to distribution depots and shipping, and in downstream operations from depots and dispensers to tankers of all sorts and to end users.

Oil and gas pipelines are an important economic transmission method for transferring oil and gas from the field to processing center, or from processing center to distribution points and/or consumers. Because of the nature of oil and gas and the various corrosive components they typically carry, and the weather and soil conditions to which the pipeline is exposed whether embedded in the earth or exposed, the capability of the steel structure of the pipes and other components and/or the protective coating(s) inside and/or outside thereof; external geohazards; operator errors; malfunctioning of pipeline equipment; as well as other manually caused destruction; etc.; these factors contribute different failure modes and rates as the follows:

Pipeline transmission is the most cost-effective means in transporting the product in the oil and gas industry. While these important assets are generally considered robust and safe, they are susceptible to natural causes of slow, but certain, corrosion, geohazards, human errors in excavation and operations, intentional tampering and destruction, and theft of product. Oil and gas and other commodities moving via pipelines, even with the best conventional internal-based integrity monitoring systems with computational pipeline monitoring (CMP) are still at risk of leakage releases. Financial losses and damages caused by leaks in the United States alone reached more US$300 million annually in 2018 alone; damage to the environment can also be extensive, e.g., as from major leaks or damage.

Major contributors to pipeline failure are corrosion of the pipeline (inside and to a lesser degree outside); failure of pipeline equipment such as valves, fittings, pumps, etc.; operational errors and failures, damage by human factors such as excavation and stealing of product and/or equipment; operator errors; failure of welds and pipeline materials; failures caused by outside factors, e.g., earthquakes and other natural causes, and the combination of all other significant and minor contributors.

While there are many conventional individual solutions for providing quantitative measurements of data characterizing the functioning of the pipeline, there is none that are known to provide an integrated approach that can be cost effectively in providing monitoring of the gradual and/or such changes to the functioning of the pipeline for transmission. Some of the approaches are outlined in the attachment provided at the end of this patent invention disclosures. They attached and incorporated as part of the invention disclosure.

The majority of conventional monitoring of oil and gas pipelines are done onsite of the pipeline, manually, and when needed, by excavation at suitable locations for inspections.

Externally-based pipeline detecting systems are primarily designed for looking at the external surroundings and detecting leakage once it is outside of the pipeline, i.e. after the fact when significant damage may have already occurred. When customized and effectively engineered for transmission of a specific pipeline fluid, they reportedly can detect small spills and locate commodity leakage with a relatively high degree of accuracy. However, most of the conventional systems and solutions are believed to lack the capability to provide more quantifiable pipeline integrity data that is useful for predictive maintenance and remedial action before actual leakage and/or losses have occurred.

Pipeline operators have been deploying both internally-based and externally-based detection systems for monitoring pipeline integrity for their supervisory control and data acquisition (SCADA) systems. Traditional SCADA systems embedded inside pipelines can provide accurate flow and other data information, but only from the locations at which they are provided which generally are at widely separated locations in between transmission points. They generally do not provide adequate granularity and visibility along the thousands of miles of pipelines.

Applicant believes there may be a need for a pipeline monitoring system that can provide an integrated overall monitoring function of many aspects of a pipeline system.

Accordingly, a pipeline monitoring system may comprise: a plurality of sensor modules disposed proximate elements of the pipeline system, each sensor module comprising: one or more sensor units including a plurality of sensors including, e.g., a flow sensor for sensing a flow of material in the element, a thickness sensor for measuring thickness of a wall of the element, a vibration sensor for measuring vibration at the element, and a leak sensor for detecting leaks of media near the element, each sensor unit being disposed adjacent to the element; a controller processor coupled to the one or more sensor units to receive data sensed by the sensors thereof; a location device for providing location data and date-time data; wherein the controller processor associates the location data and the date-time data with data sensed by the sensors, whereby the data sensed by the plurality of sensors is geo-tagged; a communication device transmitting the geo-tagged data and receiving control commands; and a central facility comprising: a communication device for receiving the transmitted geo-tagged data and for transmitting control commands to the plurality of sensor modules; a server to process the received geo-tagged data and to store the received geo-tagged data in a relational database; wherein memory associated with the one or more servers contains the relational database and the geo-tagged sensor data and contains standardized exception data relating to safe operation of the pipeline system; wherein the servers process the geo-tagged data to: analyze data from the flow sensors to determine the direction and velocity of the flow of material in the element and to compare the determined direction and velocity of the flow of material to standardized flow exception data therefor; analyze data from the thickness sensors to determine the thickness of wall of the element and to compare the determined thickness of the wall to standardized thickness exception data therefor; analyze data from the vibration sensors to determine the magnitude and frequencies of vibration at the element and to compare the determined magnitude and frequencies of the vibration to standardized vibration exception data therefor; analyze conductivity data from the leak sensors to determine the occurrence of a leak of material in the pipeline element and to compare the determined conductivity to standardized conductivity exception data therefor; wherein the servers process results of comparing the determined data to standardized exception data to determine when an exception exists, and wherein when an exception exists, the one or more servers generate an alert and communicate the alert via a display, a human interface device and/or the communication device of the central facility.

Further, a pipeline monitoring system may comprise: a multiplicity of thickness sensors disposed at elements of the pipeline system for measuring the thickness of walls thereof over periods of time; a multiplicity of vibration sensors disposed at elements of the pipeline system for measuring vibration data at the pipeline elements over periods of time; plural controller processors coupled to respective groups of sensors, each group of sensors including ones of the sensors and ones of the vibration sensors, to receive data sensed thereby; location devices providing location data representative of the location thereof and date-time data; wherein the controller processors associate location data and date-time data with data sensed by the sensors, whereby the data sensed by the sensors is geo-tagged; plural communication devices coupled to the plural controllers processors for transmitting the geo-tagged data sensed by the sensors and for receiving control commands; and a central facility comprising: a communication device for receiving the geo-tagged data and for transmitting control commands; one or more servers configured to process the received geo-tagged data in a relational database; a memory contains the relational database and the geo-tagged sensor data, the memory further containing standardized exception data relating to safe operation of the pipeline system; wherein the servers are process the geo-tagged data to: analyze data from the thickness sensors to determine the thickness of the wall of the element and the rate of change in the thickness thereof as a function of time, and to compare the determined thickness of the wall and the rate of change thereof to standardized thickness exception data therefor; analyze data from the vibration sensors to determine the magnitudes and frequencies and times of vibration at the element and to compare the determined magnitudes and frequencies of the vibration in the frequency domain and/or the determined magnitudes and times thereof in the time domain to standardized vibration exception data therefor; wherein the servers process results of comparing the determined data to standardized exception data to determine when an exception exists, and a display and/or human interface device, wherein when an exception exists, the servers generate an alert and communicate the alert via the display, the human interface device and/or the communication device of the central facility.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1A:
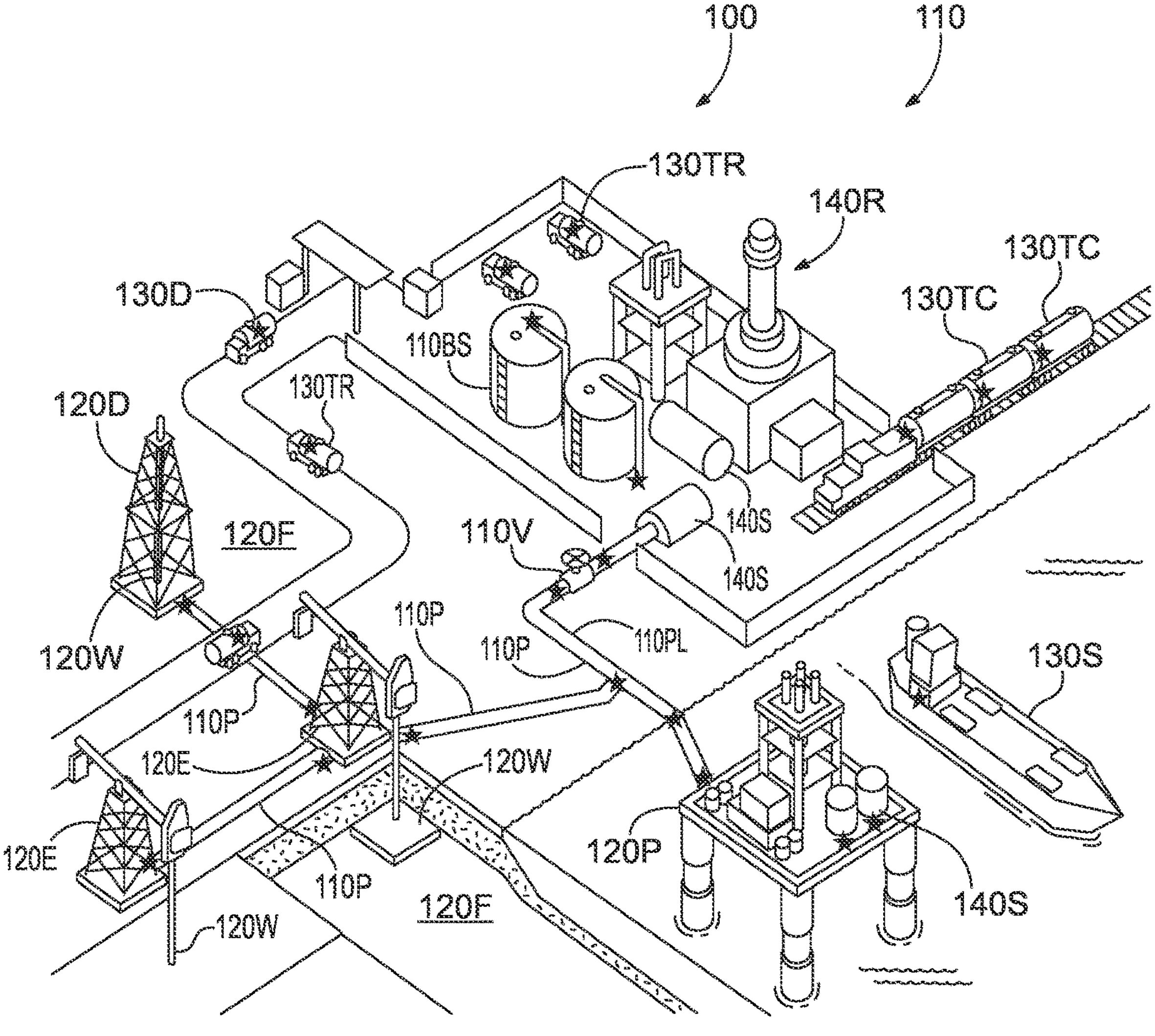
FIGS. 1A and 1B are perspective views of example embodiments of a pipeline monitoring system in relation to facilities for producing and/or transferring various materials.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "-1" or "-2" or "-N" or "A" or "B" or the like, to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Applicant proudly introduces its integrated sensors-based Pipeline Integrity Monitoring System (PIMS) 100 which is designed to provide pipeline operators 24/7/365 visibility of transmission pipelines and which is capable of being employed for, inter alia effecting preventive maintenance and remediation before leakage and the damage resulting therefrom occur.

Applicant's Pipeline Integrity Monitoring System (PIMS) 100 is engineered for non-intrusive installation on external surfaces of pipelines, and particularly at choke points, e.g., at branching and multiple input features, and with repetition, e.g., regular intervals, along long sections of pipelines which tends to enable cost effective pipeline integrity monitoring with high granularity of operational data for better monitoring and preventative action.

Besides providing visibility of pipeline operation and transmission failures, the PIMS monitoring system 100 can be applied at any desired location of the pipeline system 110, including at choke points, to provide full supply chain safety and security visibility from drilling locations to refinery and/or processing locations, and to end customers as illustrated herein.

The integrated monitoring PIMS solution 100 described herein combines plural quantifiable digital measurements to provide predictive capability for enabling both preventive and remedial actions when sudden danger is sensed, with substantially immediate generation of alerts for taking action, e.g., maintenance and/or repairs, before a pipeline failure occurs, thereby to enable pipeline failure to at least be substantially reduced and in many instances prevented.

Pipeline transmission accidents can be caused by multiple factors. The Pipeline Integrity Monitoring System (PIMS) is non-intrusive, easily installable onto the surface of the pipeline, including existing pipelines, to measure and monitor quantitative data relating to pipelines systems, and to determine trending characteristics of the relevant pipeline's measurable data, thereby to provide a predictive and/or preventative capability for reducing pipeline failures and errors. The arrangement described herein can provide cost-effective monitoring solutions along part or the full length of miles and kilometers of pipeline, at critical choke points, as well as in areas of special concern. The described arrangement monitors and gathers data autonomously once the PIMS system is installed and activated. While the systems and solutions are illustrated for the use of oil and gas transmission by pipeline, they are also applicable for any media that can be transported via pipelines.

Figure 1B:
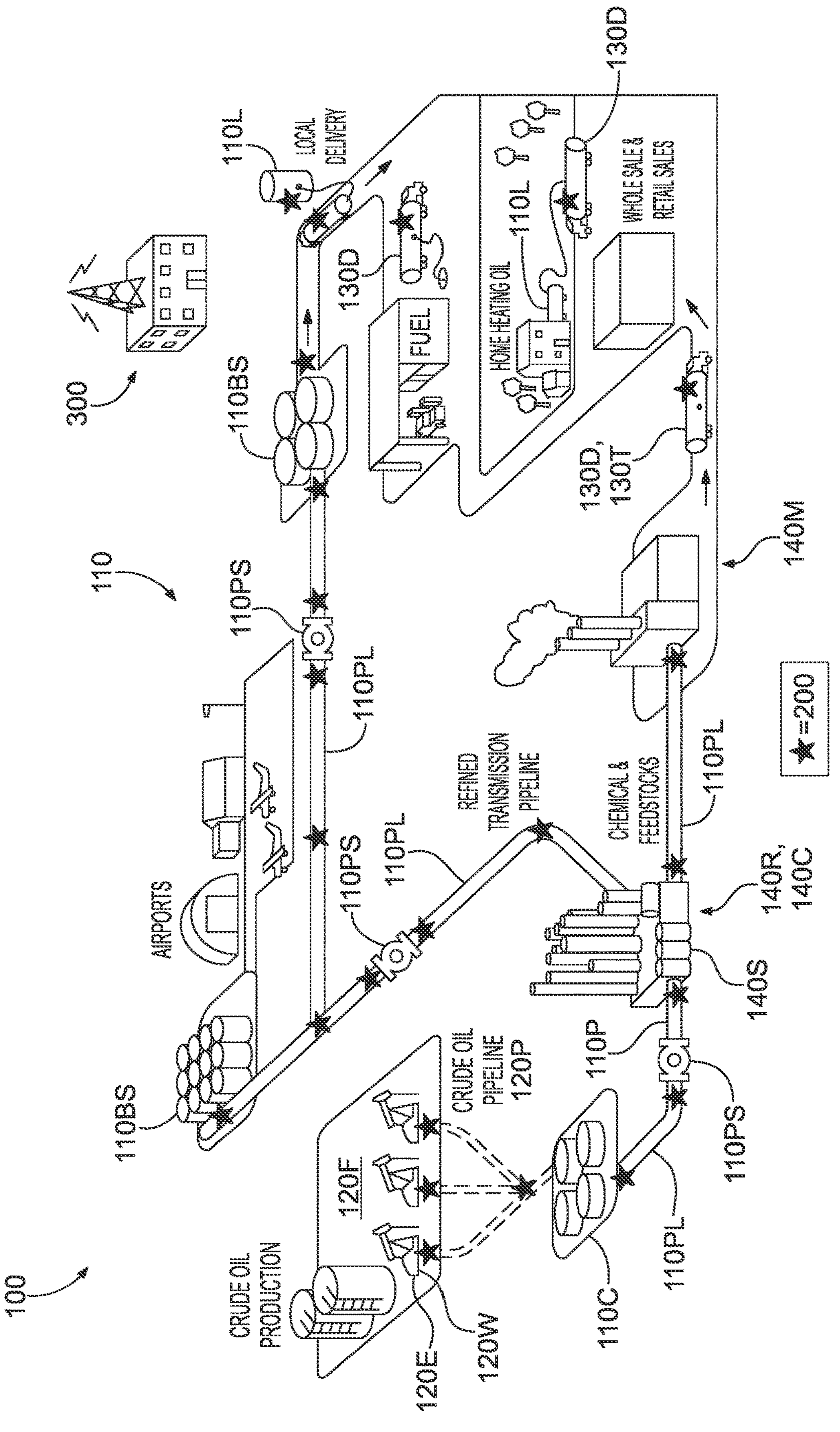
Figure 2:
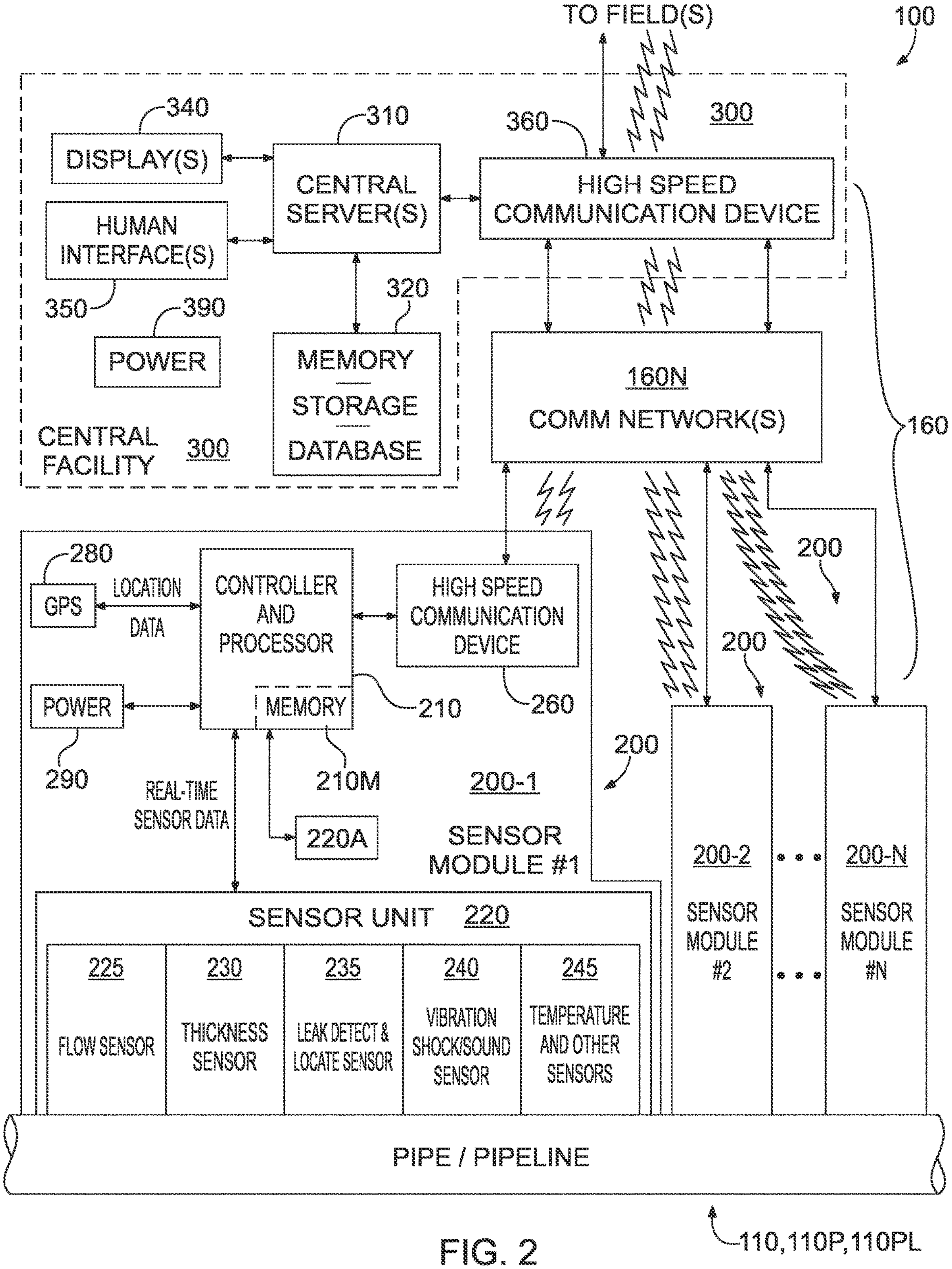
FIG. 2 is a block diagram of an example embodiment of a pipeline monitoring system in accordance with the present arrangement.

FIGS. 1A and 1B are perspective views of example embodiments of a pipeline monitoring system 100 in relation to facilities 110 for producing and/or transferring various materials; and FIG. 2 is a block diagram of an example embodiment of a pipeline monitoring system 100 in accordance with the present arrangement. PIMS 100 includes a plurality of modules 200, also referred to as sensor modules 200, that are located on various parts of a pipeline system 110, and that are in communication 160, 260, 360 with one or more servers 310 in a central facility 300 whereat the data produced by and transmitted from the sensor modules 200 are processed to monitor and determine the condition and operational status of the pipeline 110. Examples of materials that may be carried and/or contained by such "pipelines" include, without limitation, oil, gas, water, chemicals, sludge, slurries, sewage, and other media able to be carried, processed and/or stored thereby. Examples of locations of sensor modules 200 are indicated by a star (*) in these Figures.

Facilities 110, also referred to as pipeline system 110, may include, e.g., any one of more of sources 120, wells 120W, fields 120F, platforms 120P, derricks 120D, extraction equipment 120E, transports 130, ships 130S, tankers 130T, tank cars 130TC, trucks 130TR, delivery vehicles 130D, drayage vehicles 130D, plants 140, storage tanks 140S, refineries 140R, chemical plants 140C, manufacturing facilities 140M, and the like, as well as associated pipes 110P, pipelines 110PL, pumps 110PU, pumping stations 110PS, valves 110V, conduits 110C, bulk storage containers 110BS, local storage containers 110LS, and the like, and any and all combinations thereof. For simplicity, any and all of the foregoing may be referred to herein as a facility, facilities, a pipeline and/or a pipeline system, and be included in item number 110.

PIMS 100 incorporates plural or multiple modules 200 including one or more sensor units 220 that are installed externally and non-intrusively on parts of the pipeline system 110 for providing quantitative and/or relative measurements of factors along the pipelines that reflect and/or affect their functioning. Sensor modules 200 can be installed, e.g., any where along the pipeline system 10 including at any or all of the "choke points" of pipelines along the supply chain linkage for providing full visibility of the supply chain infrastructure for more secure and effective management. Sensor modules 200 may be fastened to pipes, pipelines and other pipeline system 110 elements by various fasteners, e.g., metal straps, plastic straps, adhesives, magnets, and the like.

The term "choke points" is typically used to refer to locations along the pipeline system that are other than a straight pipe; examples include valves, elbows and turns, divisions of one pipe into plural pipes, connections of plural pipes into one pipe, manifolds, changes in diameter and/or cross-sectional area, pumps, meters, flow limiters, restrictions, transitions between above-ground and underground or underwater pipes, inlets to and outlets from tanks and other containers, and the like.

Figure 3:
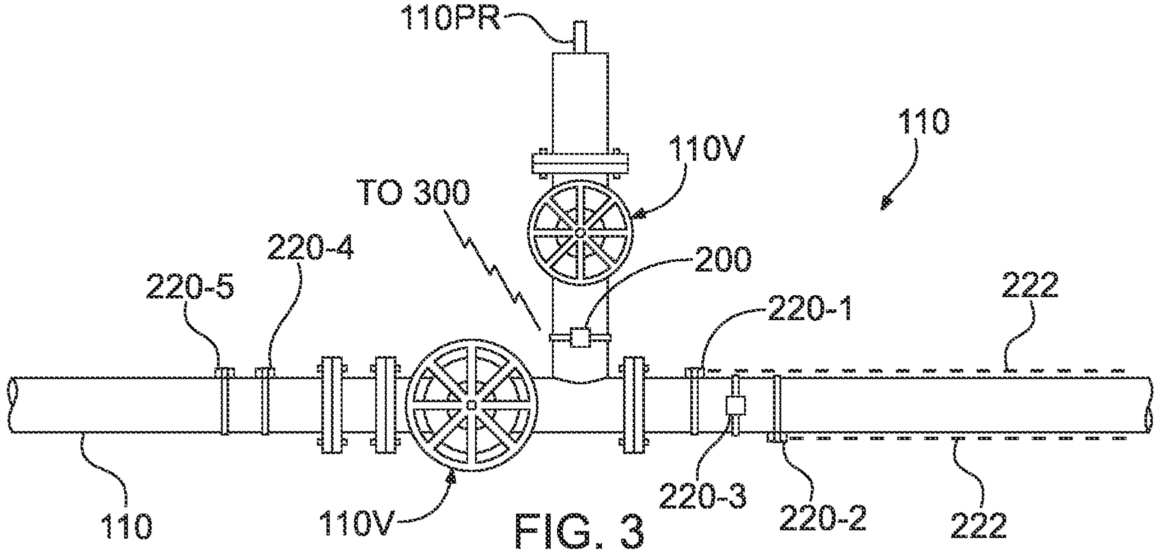
FIG. 3 is a diagram illustrating an example valve in an example pipeline system with example sensor modules thereon.

FIG. 3 is a diagram illustrating an example choke point, e.g., a valve 110V, in an example pipeline system 110. Valve includes inlet pipe 110V-I and outlet pipe 110V-O and has a valve control, here illustrated by a hand-wheel 110V-H, for opening and closing the valve. Valve control 110V-H may be a remotely controllable electric motor or solenoid device or a hydraulically actuated device. Sensor module 200 associated with valve 110V includes plural sensor units 220 disposed at its inlet and outlet and a control unit 200-C that includes the processor 210, location device 280 and power supply 290, and is coupled to sensor units 220 via physical wiring or a wireless, e.g., Bluetooth® network, connection. Further, a pressure release device 110PR may be provided in which case, a sensor unit 220 is also disposed thereon for monitoring the flow of media that may be released therethrough, whether actuation thereof is by manual action or by automatic action, e.g., by over pressure.

Sensor modules 200 can monitor some or all of the following aspects of pipeline operation, conditions and issues:

Changes in relative flow rate; flow paths, presence and absence of flow, coupled with vibration and temperature data, which can be used to document and analyze all movement of products along the supply chain 110, as well as leakage, and operational errors, to provide actionable alerts and initiate remedial actions.

Theft and tempering which can be detected, controlled and prevented using the capability of vibration analysis for distinguishing, e.g., excavation and geohazards, from, e.g., drilling, cutting and other physical tampering, e.g., for theft of the media being transported by pipeline system 110.

The data collected by one or more sensor modules 200 from events that may cause disruption of the pipeline-based supply chain are captured by sensors of sensor modules 200 and are communicated 160, 260, 360 at high speed via one or more communication networks 160N, e.g., a cellular network, satellite communication ("satcom"), a Wi-If network, LoRAN, a wireless mesh network, etc. and any combination thereof, to a central monitoring center 300 and server or servers 310 thereof for 24/7/365 monitoring and in case of exceptions to or deviations from normal safe operation, thereby to generate and provide alerts in real-time.

PIMS 100 comprises plural sensor modules 200 or sensor units 220 that are disposed on various parts of the pipeline system 110; in practice, a relatively large number of modules 200, 200-1, 200-2, . . . 200-N may be provided for pipeline system 100, with a few modules 200 being clustered near a particular item of equipment, e.g., a valve, and with others disposed spaced apart along a relatively long length of pipeline, e.g., at spacings of hundreds of meters or up to a few kilometers.

Plural sensor units 220, e.g., 220, 220-1, 220-2, . . . 220-N, may also be placed in close proximity and can transmit data and communicate via a sensor module 200, e.g., one 220-1 on the top of the pipeline and a second 220-2 directly underneath on the bottom of the pipeline, and a third 220-3 on the side of the pipeline, which can be useful regarding monitoring different corrosion conditions, e.g., corrosion, that can exist on different parts of the inner surfaces thereof. Plural sensor units 220-4 and 220-5 can be relatively closely spaced on the pipeline as can enhance certain sensing conditions, e.g., flow measurements and acoustic and/or vibration which tend to travel along a pipeline. Optionally, sensor modules 200 and/or their sensor units 220 can be designed to have capability for providing plural or multiple channels for data measurement and collection, e.g., up to 8 or 16 or more probes and data channels, with switching and/or sequencing mechanisms to provide that increased monitoring capability.

Because data from all of the different sensor modules 200 and the various sensors 220-245 thereof are coupled together in a central facility 300, e.g., in a database, preferably a relational database, thereof, that data can be employed for detecting most if not all of the factors that affect the transmission of the pipeline media, e.g., oil and gas or other media. The data collected and stored in the database accumulates over time, which enables PIMS 100 to provide a data set that is well suited for analysis using artificial intelligence-based (AI) for enabling effective and efficient preventative and timely maintenance and repair, as well as the prediction and prevention of disasters from pipeline failures.

Module 200 comprises a sensor unit 220 including a plurality of sensors 220-245 for sensing various conditions and parameters—including an ultrasonic flow meter sensor 225 for measuring and monitoring the direction and speed of the flow of material in the pipeline, an ultrasonic thickness gauge sensor 230 for measuring and monitoring the thickness of the wall of the pipeline and changes therein, a temperature sensor 235 for measuring and monitoring the temperature of the pipeline and the change thereof, a shock and/or sound sensor 240 for measuring and monitoring pipeline leakage, damage and/or breakage, and other sensors 245, e.g., a leak sensor, a strain gage sensor, galvanic potential sensor or meter, and the like.

Sensor module 200 may include one or more sensor units 220 which may be in a common physical container and/or ones of the sensor units 220 may be in separate physical containers from the container that includes the remainder of the components 210-290 of sensor module 200. Separate sensor units 220 may be disposed up to about 10 meters from the remainder of sensor module 200, and may be coupled thereto by physical electrical wiring, e.g., when they within 1-2 meters of each other, and/or a wireless link, e.g., a Bluetooth® link, when they are apart from each other by a greater distance.

This aspect of the present arrangement 100 for separately packaging sensor units 220 and sensor modules 200, is advantageous in regard to, e.g., monitoring wall thickness where plural sensor units 220 are disposed, e.g., on the top of the wall of a pipe, on the bottom thereof, and optionally, in between on the side of the pipe, as well as at choke points where separate sensor units are disposed to monitor the input and output of a pipeline element, e.g., a pump, valve, manifold or other choke point. This aspect is also advantageous where vibrations and/or sound is measured and monitored, e.g., for excavation which typically is in the about 1-60 Hz frequency range or for cutting or drilling which is typically in the about 500-5000 Hertz frequency range.

Further, the foregoing aspect enables PIMS 100 to include monitoring of moving elements of the media transport systems 110 and other aspects that are not fixed, including, e.g., transports 130, ships 130S, tankers 130T, tank cars 130TC, trucks 130TR, delivery vehicles 130D, and the like, as well as associated pipes 110P, conduits 110C, dispensing hoses, and the like, and any and all combinations thereof. Sensor units 220 in such instances would be disposed on such vehicles and on parts thereof with interconnection to the remaining parts of sensor module 200 via electrical conductors and/or wireless links, wherein communication device 260 thereof may be a cellular communication device, e.g., a smart phone or cellular phone, whereby data from sensor units 220 is transmitted to central facility 300 via a cellular network 160 and other communication networks 160.

Where a sensor unit 220 is physically part of a sensor module 200, e.g., both are contained in the same physical container, then sensor module 200 is disposed closely adjacent to the element of the pipeline (pipeline element) such that sensor unit 220 is closely adjacent to the pipeline element that it is to sense and monitor. Where a sensor unit 220 is not physically part of a sensor module 200, e.g., where one or more sensor modules 220 are contained in separate physical containers, then each sensor unit 220 is disposed closely adjacent to the pipeline element that it is to sense and monitor. Being closely adjacent means that sensor units 220 and sensor modules 200 are physically disposed on an exterior surface of the pipeline element, e.g., being attached thereto by straps or bands or adhesive, or mounted to mounting pads, that provide sufficient physical contact with the pipeline element that the sensors 225-240 of sensor units 220 are operative to sense the parameters of the pipeline element that they are intended to sense and monitor.

Data from sensor modules 200 are preferably gathered during suitable periods of time and for suitable durations of time under the control of processor 210, e.g., an onboard controller and processor 210 and its associated memory 210M in which data obtained in realtime rom the various sensor modules 200-200-N and sensors 220-245 thereof can be stored. Sensor module 200 further includes a location device 280 which determines the location of module 200 and provides location data and time stamp data, e.g., the date and time at the location of the device 280 and module 200, also referred to as date-time data.

Location device 280 may be, e.g., a GPS device or other suitable geo-location device that determines its own location and the date and time at that location, typically from transmitters on satellites in earth orbit or fixed at predetermined terrestrial locations. Location device 280 is preferably a receiver for a GPS or other satellite-based locating system capable of providing location, including elevation, to a high accuracy, e.g., within a few meters or less. Optionally, global position determining units (location devices) 280 may be available for use in modules 200 that are responsive to one or two or more different and independent global positioning systems, e.g., the US GPS system, the Russian GLONASS system, the European Galileo system, the Indian IRNSS system and/or the Chinese BDS system, may be employed so that geographic location data is available wherever PIMS 100 may be deployed.

The location data and time stamp data (i.e. date and time data, or date-time data) is associated by processor 210 with the data provided by sensors 220-245 whereby the data is geo-tagged. The terms "geo-tag" and "geo-tagging" are used to indicate that the sensor data, the location data and the time stamp data are associated with each other, whereby the combined data can be processed 210 and analyzed 210 to determine conditions at specific locations at specific times so as to monitor and determine pipeline conditions at particular times and between particular times so that both present and changing conditions can be determined and monitored.

Data from sensor modules 200 are preferably gathered during suitable periods of time and for suitable durations of time, and are preferably transmitted, collected, accumulated and stored by a separate controller and processor 210, 300, typically one or more servers 310 located in one or more central facilities 300. The locations of sensor modules 200 may be by pre-assignment and/or on an as needed basis, and the locations of the sensor modules 200 are logged and stored. Further, the data from each sensor module 200 is tagged with the GPS 280 location data thereof (i.e. is geo-tagged) and with a date-time stamp of the date and time of when the data was produced before they are communicated 160 for processing and storage, e.g., in the central facility 300.

Controller and processor 210 provides for data collection, processing and storage in close proximity to sensor unit 220 at the pipeline location being measured and monitored, which proximity tends to improve the accuracy and/or reliability of data collection and processing, e.g., as where there is a hardwired connection therebetween. Where plural sensor units 220 are to be provided in close proximity to each other on the pipeline system, they can be controlled and monitored by common elements, e.g., by the same processor 210, GPS location device 280, communication device 260 and power source 290, thereby providing common operating resources 210, 260, 280, 290 for a sensor module 200 that includes plural sensor units 220 that are on the pipeline 110 at relatively closely spaced locations.

Sensor module 200 further includes a communication device 260, e.g., preferably a communication device 260 having a relatively high-speed data transmission bandwidth, for transmitting geo-tagged data from sensor modules 200 to central facility 300 via any one or more of available communication links and/or networks, e.g., the examples identified hereinabove. Each module 200 preferably has a pre-assigned unique Internet Protocol (IP) address that is stored in the module memory 210M and that is also stored along with the location at which the module 200 is to be located in a database on the servers 310 of the central facility 300. By comparison of the geo-tagged data received from each module, the location of each reporting module 200 may be verified by comparing the geo-tagged data (e.g., its location, date and time) and IP address received from the module 200 with the module's unique IP address and its assigned location, e.g., as stored in the server memory.

The geo-tagged data are preferably communicated 160, 260 from sensor modules 200 to the central controller 300 and processor 310 via high-speed connections 160, 260, 360 and networks 160N employing, e.g., one or more of a cellular network, satellite communication, Wi-If networks, LoRAN, wireless mesh networks, and the like, to a central monitoring center 300, also referred to as a central facility 300, e.g., one or more servers 310 thereat. As a result, continuous monitoring 24/7/365 can be provided; and in a case where an exception from normal operation arises, alerts and/or notifications can be generated and provided to appropriate recipients substantially in real time for initiating appropriate responses, e.g., inspections, maintenance and repairs.

Central facility 300, also referred to as a monitoring center 300, is "central" in the sense that it is a facility or facilities whereat data from the sensor modules 200 for pipeline system 110 is received, collected, processed and stored. Central facility 300 need not be in any particular geographic location relative to pipeline system 110, and while it may be convenient to locate central facility 300 relatively closely to a part or element of pipeline system 300, e.g., near a refinery or a storage and distribution facility, that need not be the case. Central facility 300 can be as far from pipeline system as may be desired provided that it is in communication with sensor modules 200 via communication systems and networks 160, 260, 360. In fact, central facility 300 need not be in a single location, but may be, and in some cases preferably is, in plural locations so as to provide redundancy of its functions and remote backup data storage that will not be affected by storms and other weather events and/or earthquakes and other geohazards.

Sensor modules 200 and central processing resources 300 can be powered 290, 390 by, e.g., AC power, battery power, and preferably can be backed up with power from and/or recharging from solar panels and other alternative power sources, e.g., when the usually employed power sources are not available or lose power and when sensor modules 200 are disposed on and/or along pipeline system 110 at remote locations, e.g., up to a kilometer apart along long lengths of the pipeline.

The PIMS 100 operates based on quantitative data and is engineered to address most of the challenges encountered in both older and newly installed pipelines. Besides resolving some of the false alarms with the multiple and integrated sensors in conventional installations, the combination of sensors 200, communication devices 160, 260, 360 and data processing 210, 310, 320 in the pipeline monitoring arrangement 100 described herein inherently helps to mitigate the effects of human factors, such as overload, fatigue, staff turnover and changing resources availability.

Communication devices 260 typically include a transceiver 260 that transmits geo-tagged sensor data and module 200 status data via networks 160, 160N to communication device 360 at central facility 300 and receives commands and data inquiries via networks 160, 160N from communication device 360. Communication device 360 at central facility 300 typically includes a transceiver 360 that receives geo-tagged sensor data and module 200 status data via networks 160, 160N from communication devices 260 of modules 200 and transmits commands and data inquiries to modules 200 via their communication devices 260.

PIMS 100 sensor modules 200 are designed and configured to be self-monitoring and self-powered, preferably by plural sources of electrical power 290, e.g., local AC power, battery power, solar array power and any other available power source, for "24/7/365" autonomous data gathering, analysis and transmission.

Sensor units 220 of sensor modules 200 include plural sensors 225-245 that sense different parameters and characteristics for the part or element of the pipeline system 110 that they are disposed at and are monitoring. Sensor 225 may be a flow sensor, e.g., a sensor of the volume, speed and/or direction of flow of the media, e.g., oil or gas or water, etc., that is passing the location in pipeline system 110 at which it is disposed. Suitable flow sensors 225 include ultrasonic transducers that emit ultrasonic waves into the pipeline and receive return ultrasonic waves from the media inside the pipeline at its location from which flow volume, speed and direction are determined.

Equipment failure, including valve, fitting, joint and welding, pump, and other components, that affect the flow of fluid in a pipeline are monitored using the relative rate of change in fluid flow as measured using flow monitoring sensors 225, e.g., ultrasonic flow sensors 225, at judicially selected locations e.g., at branching pipelines. Changes in relative or differential flow rates, flow paths, and/or the presence or absence of flow, causes flow sensors 225 to provide flow data that is used for monitoring and detecting leakage and analyzing operational errors to provide actionable alerts and remedial actions. Further, such flow data can be coupled with, e.g., combined with, vibration data and temperature data also for monitoring and detecting leakage and analyzing operational errors to provide actionable alerts and remedial actions.

Incorrect operation and/or operational errors are monitored by the same relative flow rates and/or changes in fluid flow by making comparisons using flow data from ultrasonic flow monitoring devices 225 of adjacent monitoring unit modules 200 which are preferably judicially located at branches in the pipelines.

Plural or multiple flow meter sensor 225 sets can be used, e.g., at choke points and branching flow zones, for monitoring the correct flow characteristics thereat, e.g., at input and output locations, thereby to monitor and detect malfunctions of the controlling valves, pumps and other components, e.g., passive components such as fittings, etc., at such choke points, as well as, errors in operations thereat, e.g., departures from the desired operational settings and/or configurations.

Examples of suitable flow and/or gage sensors include, e.g., a model TUF-2000B ultrasonic flow meter available from Kaifeng Instrument Company Ltd. of Kaifeng, Henan, China, as well as flow meters available from Siemens Corporation USA of Washington, DC, USA, and from Badger Meter, Inc. of Milwaukee, Wisconsin, USA.

Sensor 230 measures thickness. Corrosion of pipes and pipeline systems 110 used in, e.g., oil and gas transmission, particularly internal corrosion, is one of the major causes of failure and leakage that cause contamination of and damage to the environment and economic loss. Corrosive factors that are particularly significant on the top side of the pipelines, e.g., called top-of-line-Corrosion (TOLC), are different from those that are significant to the bottom of the pipeline, e.g., those that are caused by under deposit corrosion (UDC) as illustrated in FIG. 5. Corrosion internal to a pipe or pipeline is monitored by periodic pipe thickness measurements, both of relative thickness or calibrated absolute thickness.

Figure 4:
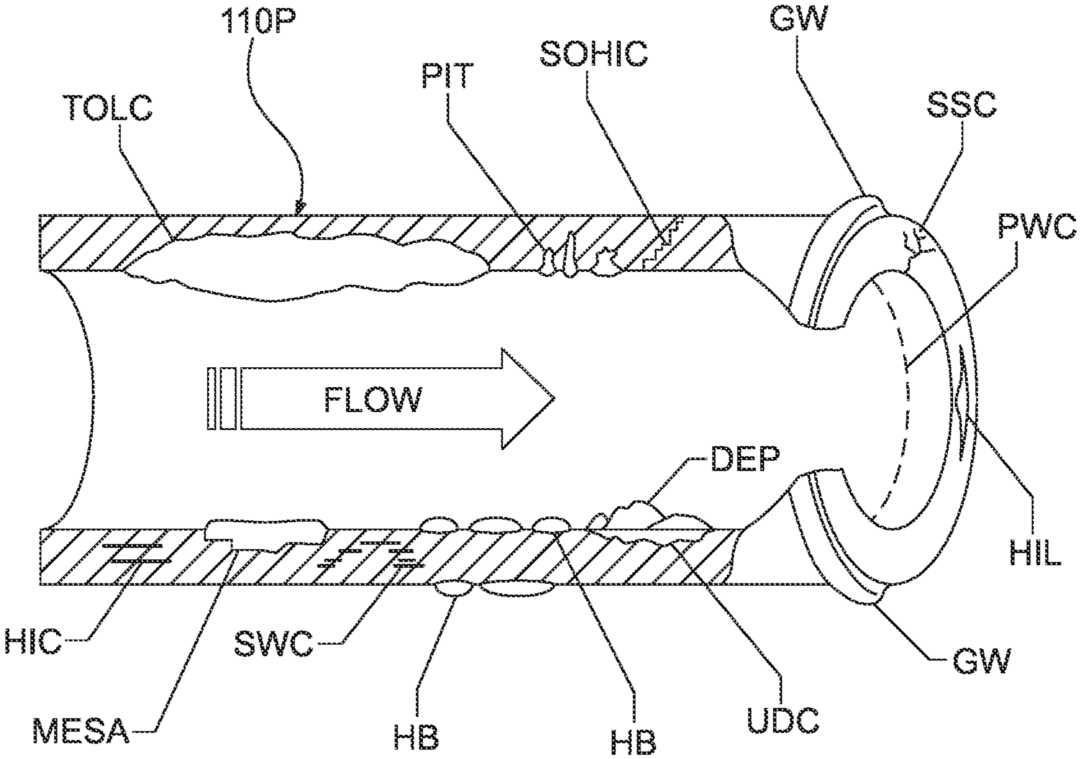
FIG. 4 is a diagram illustrating a cutaway view of an example section of an example pipe of an example pipeline system illustrating example corrosion and other effects thereon.

Sensor 230 may be, e.g., a sensor of the thickness of the walls of the part or element of pipeline system 110, e.g., a pipe 110P, at the location whereat it is disposed. FIG. 4 is a diagram illustrating a cutaway view of an example section of an example pipe 110P of an example pipeline system 110 illustrating example corrosion and other effects thereon. Examples of corrosion effects include, e.g., TOLC (top of line corrosion), PIT (pitting), SOHIC (stress-oriented hydrogen induced corrosion), GW (a girth or circumferential weld), SSC (sulfide stress cracking), PWC (preferential weld corrosion), HIL (hydrogen induced lamination separation), DEP (deposit inside the pipe), UDC (under deposit corrosion or cell corrosion), HB (hydrogen blistering corrosion), SWC (seam weld corrosion), MESA (mesa attack corrosion, often forming beneath an iron carbonate film resulting in erosion in the shape of a mesa) and HIC (hydrogen induced cracking), and the like.

Pipeline wall thickness measurements in PIMS 100 are preferably measured by ultrasonic means or, in the case of steel structures, by magnetic means, and those sensors 230 are preferably digital thickness sensors. While absolute accuracy is important, for most ultrasonic thickness measurements, the exact accuracy is not as important as is the resolution of the measurements. For example, the resolution of an example thickness sensor 230 is typically about 0.1 mm, and preferably is about 0.01 mm which facilitates analyzing relatively changes in thickness that occur over relatively long times. Because corrosion affecting the thickness of the pipeline elements, e.g., steel pipes, are relatively slow acting, the period between measurements can be relatively long, e.g., in the range of days and weeks between measurements.

The slowness of thinning of pipeline walls and the low rate of thinning caused by corrosion renders it difficult to provide a predictive capability relating to remedial replacement of pipes and other elements of pipeline systems. Among remedial actions that may be undertaken is to chemically modify the oil and gas before feeding them into the transmission system 110, e.g., pipeline system 110, to decrease the chemical characteristics of the medium being carried in the pipeline so as to reduce the rate of chemically induced thinning of the walls.

The PIMS 100 pipeline monitoring system can be used for measuring and monitoring corrosion thinning of the transmission pipeline elements even without knowing the original wall thickness. This is an important aspect in that typical steel pipeline elements have an about 20 mil (about 0.020 inch or 0.50 mm) thick or more coating of an epoxy or other coating on both the inside and the outside surfaces of the steel pipeline, and further because of the inherently different compositions of various ones of steel pipelines elements. The typical accuracy or resolution of thickness sensor 230 depends on the overall thickness of the pipeline wall and in most cases can be less than about 0.01 mm or less, which can be about 1%. of wall thickness.

In instances where the cost of excavation is too high to place sensor modules 200 on the bottom side of an already buried or hidden pipe or pipeline, even placing one or more sensor modules 200 monitoring devices, e.g., a set thereof, on and near the top of the pipe or pipeline for measuring and monitoring TOLC and other corrosion which occurs on the top wall side of the pipe or pipeline will provide adequate data to enable predictive capability of PIMS 100 that is sufficient for safe operation.

Corrosion that thins the walls of pipes and pipelines is more likely to happen at locations where the protective epoxy coating on the interior of the pipe or pipeline wall first degrades, and that may not be at the location(s) where thickness sensors 230 are placed. However, when additional adjacent pipeline monitoring system sensor modules 200 are placed nearby one another, PIMS 100 can provide similar or better predictability of corrosion effects at lower cost and less danger of pipeline damage than does periodically excavating the pipeline to inspect the pipes and pipelines, e.g., to determine wall thickness.

Ideally, sensor modules 200 and/or sensor units 220 are placed on both the bottom and top sides of pipes and pipelines, and even better, also on the horizontal side or sides thereof to provide more data for determining the effects of the corrosion mechanisms, and thus provide more predictability regarding when maintenance and/or repair or replacement of pipes and pipelines should be scheduled and performed.

In addition to disposing sensor modules 200, 230 in the top, bottom and side positions on pipes and/or pipelines, additional sensor probes can also be placed along the pipelines at closer spacings for providing more capability for observing locations at which the interior coating may have degraded, whereby the predictability and reliability of when and where pipeline safety and integrity might be compromised.

Sensor modules 200 and sensor units 220 are physically attached to elements of the pipeline system 110, wherein the sensor modules 200 and sensor units 220 are encapsulated and are bonded to the pipeline elements 110 with encapsulating materials and bonding materials that block moisture and corrosive gas from the contact area between sensor module 200 and sensor unit 220 and the pipeline element 110 whereat each is attached Pipeline thickness measurement module 200 and sensor unit 220 thereof, and/or thickness sensors 230 thereof, are designed to have capability for providing plural or multiple channels for data collection, e.g., up to 8 or 16 or more probes and data channels, with switching and/or sequencing mechanisms to provide that increased monitoring capability.

There are many commercial sources of thickness measurement devices, e.g., ultrasonic and magnetic devices, that make thickness measurements digitally and that provide digital outputs and can be controlled for making measurements as-needed, and some have multiple probes or sensor heads that provide an ability to rotate and/or move around the direction in which thickness is measured, and such sensors 230 are preferred. Examples of thickness sensors include, e.g., a model TM-8811 Ultrasonic Thickness Gauge, 0.05/7.9" (1.5/200 mm), available from Reed Instruments of Wilmington, North Carolina, a model DM5E ultrasonic thickness gauge, available from The Waygate Technologies, a Baker Hughes business, of Huerth, Germany, and a Triplett model UTG300 Ultrasonic Thickness Gauge, available from Triplett Test Equipment & Tools, of Manchester, New Hampshire, and a PosiTector model UTG ultrasonic wall thickness gauge, available from DeFelsko Inspection Products of Ogdensburg, New York.

Sensor 235 preferably is a leak detector sensor 235, and a sensor that can detect a leak more quickly and/or directly is preferred. Detection of leaks of the media being carried by the pipeline system is important for protecting the environment. Leak sensor 245 may function by measuring and monitoring the effect of the leaking media on the electrical conductivity of various polymer materials and the like that may be used on the pipes and pipelines of system 110 that are proximate to the sensor unit 220 and/or sensor module 200 including in a leak sensor 235.

To that end, a relatively long leak detector/sensor cable 222 is disposed to extend from a sensor module 200 and/or a sensor unit 220 along the top of a pipeline element if the media being carried by the pipeline system 110 is gaseous, e.g., natural gas, propane and the like, which will tend to rise if leaked, and under the pipeline element if the media being carried by the pipeline system 110 is liquid, e.g., petroleum and its products, which will tend to remain under the pipeline or drain downwards. For storage tanks 110BS, 110LS, 140S, and the like, leak detectors are preferably placed under the bottom thereof because that is where corrosion and leaks are more likely to occur, e.g., since oil and like substances tend to have lower density than water and therefore float on water, whereby water can accumulate at the bottom of storage containers.

Leak sensor cable 222 and its associated detector 222, 235 is typically about 30 meters in length and includes a plurality of individual insulated electrical conductors, e.g., 20-30 pairs thereof, and connects to a leak detector 235. Shorter lengths of leak sensor cable 222 will provide a more precise location accuracy which is essentially the length of the cable section 222, while longer lengths of sensor cable 222 will provide a less precise location accuracy. Typically, when sufficient leaked media comes in contact with the media absorbent material, the material will swell relative quickly, preferably in about two minutes, to open the electrical circuit indicating a leak has been detected.

Each leak detector 235 can connect to another length of sensor cable 222, whereby cables 222 can be "daisy chained" so that distances up to about one kilometer can be monitored. Each leak detector 235 comprises, e.g., two electrical conductors in physical contact (providing a low resistance "short circuit") within a piece of a rubber or rubber-like material that swells or expands when it comes in contact with and absorbs oil, other petroleum products and/or other media carried by and leaking from pipeline 110.

When a leak occurs proximate a leak detector 235, the leaked material is absorbed by the rubber or rubber-like material which expands, thereby to cause the two electrical conductors to move apart, i.e. to separate, and break their electrical connection. Since sensor 235 is either open or shorted, e.g., it is either a very low resistance or a very high resistance, the output is essentially digital which permits long chains of cables 222 to be connected together. Each leak detector 235 further comprises a microprocessor or other digital processor that responds to the short circuit and open circuit conditions of the rubber material by transmitting through cable 222 a signal representative of the open and short circuit conditions along with a unique identifier stored in the memory of the processor which identifies the specific leak detector element and from the database that stores its identifier and location, determines when and where a leak has occurred.

Plural such leak detector cables and detectors 222 may be connected in series, e.g., daisy-chained, to provide leak detection over longer distances from a sensor module 200 and/or a sensor unit 220. Leak sensor 235 is operative with lengths of cable 222 up to about 1000 meters, and the number of cables 222 that can be daisy-chained together is limited primarily by the number of conductors in those cables. Sensor 235 applies an electrical potential to each of the electrical conductors of cable 222 to measure the resistivity of that section of the cable 222, e.g., the current that flows or doesn't flow is measured and monitored to provide an indication of whether or not media is leaking, of an open or short circuit.

One suitable leak detection and locating device is the ELECTROSENSOR™ leak detection and locating system available from Avante International Technology of Princeton Junction, New Jersey, USA, for which sensing cables suitable for sensing different materials, e.g., for crude oil and petroleum products, for water and waste water, for natural gas, and of different lengths, are available.

Sensor 240 may be, e.g., a sensor of sound, shock, acceleration and/or vibration, of the part or element of pipeline system 110 at or near (e.g., within monitoring distance of) the location whereat sensor 240 is disposed, and sensor 240 may be referred to generally and herein as a vibration sensor 240. Thus a vibration sensor 240 can include one or more sensors of sound, shock, acceleration and/or vibration, and/or any combination thereof.

Different vibration mechanisms and sources have different frequency spectra which can be used to diagnose the functioning and/or defects thereof which cause spreading and other changes to the frequency spectrum. Drilling, including that related to stealing product, or cutting of the transmission pipes will produce a peak at a higher frequency in the spectrum which is similar to that of a gear meshing mechanism and possibly at even higher frequencies. Vibrations and sound waves propagate relatively quickly along the steel pipelines and over relatively long distances, and the ability of PIMS 100 to measure and resolve the frequencies and amplitudes thereof enables PIMS with the ability to resolve cutting-drilling tampering activity and to generate an alert for initiating a response thereto.

Spectral analysis of the frequency spectrum separates the overall vibration level into amplitudes and peaks at relatively discrete frequencies and is useful for determining the cause of the vibration or sound, be it of a pump or other machinery, or of another source or activity. For example, pump vibration tends to be in a range of about 10-60 Hz and an unusually high peak at the running speed of the pump (e.g., at 1×RPM) may indicate rotor imbalance, while such peak at the blade passing frequency (e.g., BPF=Z×RPM, where Z is the number of impeller blades or vanes) typically indicates a hydraulic issue. While high peak amplitudes usually indicate an abnormality of issue that PIMS 100 can measure and provide an alert in response, peaks of normal amplitude can indicate proper operation and peaks with amplitudes trending higher can indicate a need for maintenance.

Spectrum analysis by PIMS 100 may be in the time and/or frequency domains and be directed to analyzing vibration modes generated along the oil and gas pipeline transmission system 110, and such spectrum analysis can provide actionable intelligence useful for detecting excavation, whether or not authorized, and theft. Such vibration analysis is used for distinguishing excavation, planned and unplanned, and geohazards from drilling and cutting, e.g., for tampering and theft.

Excavation, digging, earthquakes, and other geohazards induce vibration in the pipeline that tends to be in a low range of frequencies, e.g., in a range of about 10-100 Hz. The duration of each vibration also tends to be short and the vibrations are typically intermittent, often due to their being operated manually, as compared to pumps and other pipeline machinery which tend to be operated relatively continuously. Their intensity (amplitude) will be higher when they occur closer to the pipeline due to their being attenuated in propagating through soils. Their analysis leads PIMS to generate timely alerts and initiate remedial actions for accident prevention.

The amplitude of the measured vibrations will increase when excavation or digging are approaching closer to the pipelines and reducing if it is moving in distance away from the pipeline. Thus, when such amplitude (energy) of the frequency vibration is increasing, alerts can provide time to initiate and possibly make an intervention.

Drilling, cutting and direct mechanical actions (including vibrations produced through wearing of gears) on the metal pipeline tends to be in higher frequency domain ranges and their actions tends to be either continuous or to continue for a reasonable length of time. These types of vibration waves tend to travel longer distances along the pipeline and thus are relatively easily intercepted with PIMS 100 sensor modules 200 that are installed relatively far apart, e.g., with about a kilometer or a shorter distance between sensor modules, and at choke points. PIMS 100 thus can reduce or minimize theft and losses due to equipment failure.

Typically, excavation, tampering and/or theft related damage to the pipeline 110 can be detected within minutes, and vibrations therefrom are predictively measured and monitored by the low and high frequency vibration sensors 240 of sensor modules 200. The amplitude of the vibration from excavation increases in intensity (magnitude) as the excavating moves closer to the pipeline and sensor module 200 thereon, and the vibrations typically are of relatively short duration originating within the range of the nearest vibration/sound sensors 240.

Figure 5A:
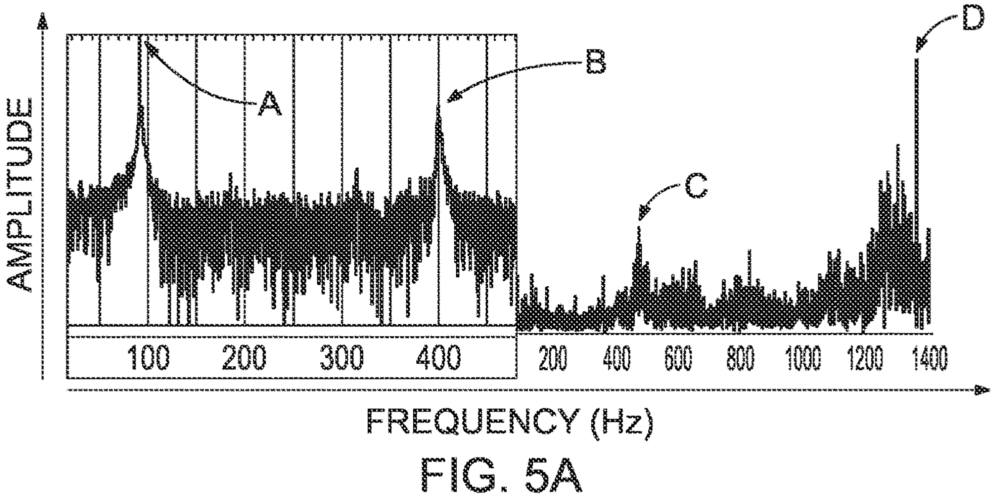
FIGS. 5A, 5B, 5C and 5D are graphical representations of certain vibration and shock characteristics relating to the example pipeline system.

FIGS. 5A, 5B 5C and 5D are graphical representations of certain vibration and shock characteristics relating to the example pipeline system 110. FIG. 5A illustrates a frequency spectrum wherein the horizontal frequency axis is presented for purposes of illustration with two different scales along its length, e.g., a first scale from about 30 to 480 Hz and a second scale from about 200 to 1400 Hz, and with a logarithmic vertical scale of vibration energy at its left end and another vertical scale thereof at its right end. At the lower frequency end, the peak A at the lower frequency, e.g., about 90 Hz, can represent, e.g., knocking and/or digging activity a round the pipeline, and the peak B at a somewhat higher frequency, e.g., about 400 Hz, can represent, e.g., particular equipment or instruments that when operating produce vibrations at those frequencies. At the higher frequency end of the spectrum, the first peak C at a frequency of about 450-500 Hz can represent, e.g., other particular equipment such as a pump or other rotating equipment, and the peak D at the higher frequency, e.g., about 1300-1400 Hz, can represent harmonics of the vibration at lower frequencies and/or resonances that respond to specific frequencies. Most natural disturbances occur at the lower end of the frequency spectrum whereas specific equipment will typically generate vibration at specific frequency or frequencies during the times they are operating.

Figure 5B:
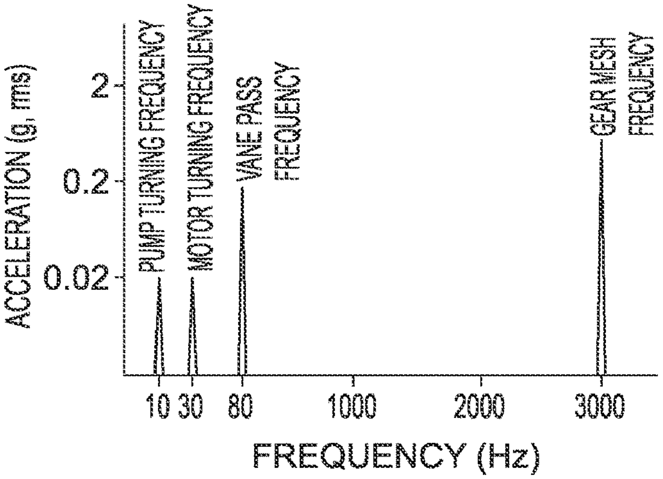

FIG. 5B diagrammatically illustrates an example acceleration v. frequency spectrum wherein several characteristic amplitude (acceleration) peaks are shown. Over increasing frequency, one represents acceleration of a pump turning which is at a frequency of about 10 Hz, the next acceleration of a motor turning which is at a frequency of about 30 Hz, next acceleration of pump vanes which are passing at a frequency of about 80 Hz, and acceleration from gears meshing which is at a frequency of about 3000 Hz.

Figure 5C:
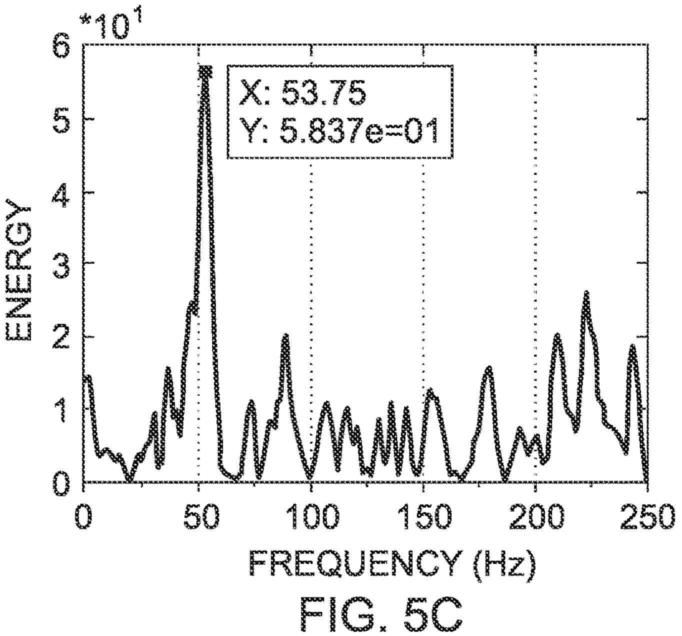

FIG. 5C illustrates an example energy v. frequency spectrum of a sort that can result from an explosion or other sharp, short event, occurring within the range of vibration sensors 240. This example represents levels of energy impinging on a buried gas pipeline from blasting for construction of a subway tunnel which occurs sufficiently close to the pipeline to be measured, e.g., by vibration sensor 240 of a sensor module 200. The blast in this example causes a peak energy peak at about 50 Hz which would typically be a short discrete event that is a one-time or few-times event, and so its very presence provides the basis for PIMS 100 to quickly generate a alert that can initiate timely and appropriate responsive actions.

As FIGS. 5A-5C illustrate, processing vibration data from sensors 240 of sensor modules 200, e.g., vibration data, acceleration data, noise data, shock data and the like, requires comparing the frequency v. time data therefrom in the frequency domain and/or the time domain for peaks at certain frequencies and/or times, and the magnitudes of those peaks and their timing to normal and expected operations of pipelines. The result of these comparisons which identify exceptions to normal and expected conditions, as do one-time changes, infrequent changes and/or slowly-occurring changes to that data which can be processed over periods of time to determining changes and rates of change, and to identify trends.

Figure 5D:
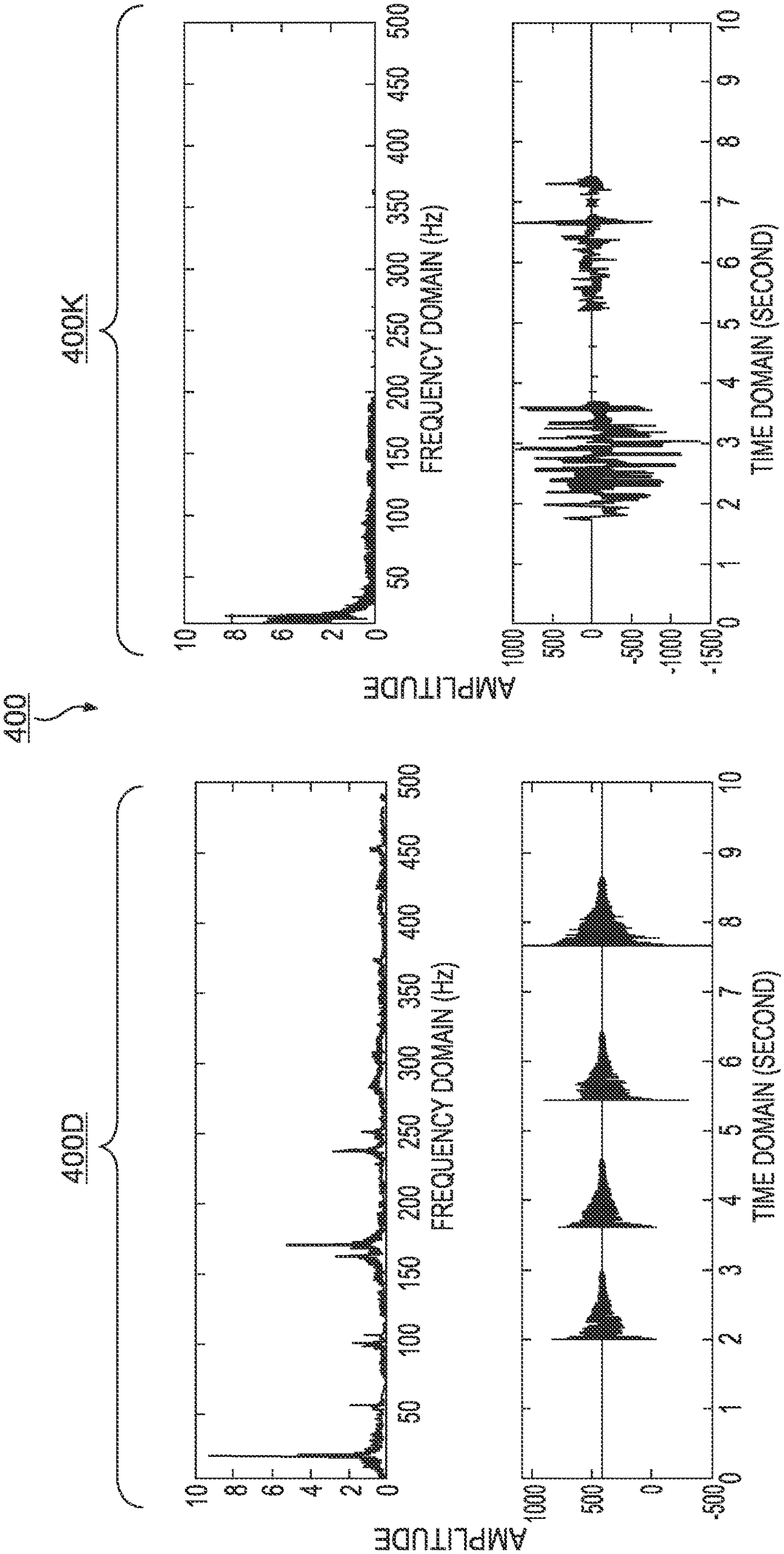

FIG. 5D illustrates two sets 400 of frequency domain and time domain data wherein the frequency domain and time domain data 400D illustrate example spectra resulting from digging and excavation occurring proximate to pipeline system 110 elements and wherein the frequency domain and time domain data 400K illustrate example spectra resulting from "knocking" on the pipeline element, e.g., as might result from hammering and/or tampering, occurring proximate to pipeline system 110 elements. These distinctive vibration signatures not only evidence the occurrence of certain events, but are compared to standard exception data and to standard urgent exception data for generating and transmitting exception alerts and urgent exception alerts.

There are many suitable commercially available vibration sensors 240 and accelerometer sensors 240. Suitable sensors 240 must incorporate measurement capability from low frequencies to high frequencies sufficient to cover vibration profiles from the drilling and cutting of pipes and pipelines. Examples of vibration sensors and accelerometers commercially available from SparkFun Electronics of Niwot, Colorado, USA, include: SparkFun 9DoF IMU (ICM-20948), SparkFun Triple Axis Accelerometer Breakout—ADXL362, SparkFun Triple Axis Accelerometer Breakout—H3LIS331DL, SparkFun Triple Axis Accelerometer Breakout—ADXL335, and SparkFun Triple Axis Digital Accelerometer Breakout—ADXL313 (Qwiic).

Sensor 245 includes, e.g., a sensor of another parameter and/or condition of the part or element of pipeline system 110 at the location whereat it is disposed. Sensor 245 and/or any desired selection of ones of its included sensors can be included in sensor unit(s) 220, either as a general implementation for most or all sensor modules 200 and sensor units 220 or as may be appropriate for particular sensor modules 200 and sensor units 220 that are to be disposed on specific pipe and pipeline elements, e.g., based upon their construction, function, materials, locations and/or other factors.

Sensor 245 can preferably include, e.g., a sensor of the temperature of the part or element of pipeline system 110 at the location whereat it is disposed. Temperature sensors 245 help by providing temperature data under normal operation that may be used to confirm that abnormal operation is absent, and may also provide supplementary data when the changes to pipeline operation and/or performance are sudden and/or extreme, e.g., a significant leak or spill, which can produce rapid decrease or increase of temperature depending upon the relative temperatures of the environment and the fluid media being transported through the pipeline.

Suitable temperature sensors of many types, e.g., thermocouples, thermistors, resistance temperature detectors (RTDs) and temperature-sensitive semiconductor integrated circuits, are commercially available from many sources.

Geohazards are monitored periodically using measurements of strain in elements of the pipeline system. Geohazards such as soil erosion, land slides, earthquakes, other and related geohazards can move, bend, deform or otherwise change or exert forces to change the shape of the pipe or pipeline which can immediately cause cracks, ruptures and/or leaks, and can also be precursors to subsequent ruptures and/or leaks.

Strain gage sensors included in sensors 245 with strain sensors oriented in multiple directions, e.g., in three orthogonal directions, can be included in sensor 245 of sensor units 220 and/or modules 200 that are mounted onto the surface of the transmission pipeline with high strength adhesive and/or metal or plastic straps having adequate flexibility so as not to crack or break with bending or other mechanical stress. The base on which the strain gauges are mounted preferably has flexibility so that the base and the strain gauges it supports will remain attached to the pipeline element even under severe strain and/or deformation conditions.

The strain data along the one or more directions, e.g., orthogonal directions, are measured periodically. The number of strain gages activated at any time and the selection of which ones can be programmed, e.g., by controls and commands provided from central facility 300, and the time period between measurements, can be varied depending the potentials for particular geohazards to occur and the expected rate of change in strain.

The magnitude of bending and/or deformation and its relative rate of change are important factors in detecting exceptions to safe levels of strain and/or adverse trends of increasing strain for providing timely alerts when excessive strain occurs. Excessive levels of strain as compared with predetermined acceptable levels, e.g., standard exception data levels, can trigger exceptions leading to generating an alert for the controlling organization, which can include inspection, maintenance and repair organizations as well as for appropriate local, state and/or federal government agencies that may provide and/or monitor possible onsite inspections, repairs and/or remediation.

Further, a gas sensor and/or detector 245, e.g., for natural gas, propane gas, methane and other gases, may also be included in a sensor unit 220 for sensing and detecting leaking of such gas from a pipeline element. Gas and natural gas sensors are typically electronic sensors that measure quantities of gas and/or natural gas, however, simplified gas sensors are sufficient in PIMS 100 because a sensing of gas or no gas present is sufficient for pipeline 110 monitoring and reduces cost when a multiplicity of sensors are to be deployed.

Corrosion external to a pipe or pipeline, e.g., in the exterior surface thereof, is monitored by periodic measurements of galvanic potential between a metal pipeline element and the surrounding earth/soil in which it is embedded or buried. Sensors 245 can include a galvanic potential sensor, e.g., a high input impedance volt meter, to measure the electrical potential between the metal pipeline element and the surrounding earth. Preferably, such meter provides data outputs in a digital form to facilitate its integration with PIMS 100.

To that end, galvanic potential sensor 245 includes an electrical connection to the metal pipeline, e.g., via an electrical contact or lead making electrical connection thereto, and an electrically conductive electrode, e.g., a pin or probe including paired metal electrical contacts, embedded in the surrounding earth/soil, wherein the voltmeter measures the potential between the connection to the metal pipeline element and the earth/soil electrode. Changes in soil conditions that produce electrolyte changes in the soil proximate to the pipeline can be detected.

While measurements for galvanic potentials inherent to the materials of the metal pipeline and the earth/soil composition provide an indication of the integrity of insulating protective coatings that ideally enclose the metal pipeline elements for preventing corrosion. Those measurements are complicated where cathodic protection potentials are applied to the pipeline. The cathodic protection potential and/or monitoring currents in the impressed current cathodic protection system in preventing exterior corrosion of steel and other metal pipelines can be measured with a high-input impedance volt meter as described.

Comparison and data mapping of galvanic potential data with similar past measurements over time provides data and data trends relating to the potential degradation of protective coatings on the pipeline exterior surfaces and/or changes in the conditions of the earth/soil that surrounds the submerged pipeline with galvanic protection.

Figure 6:
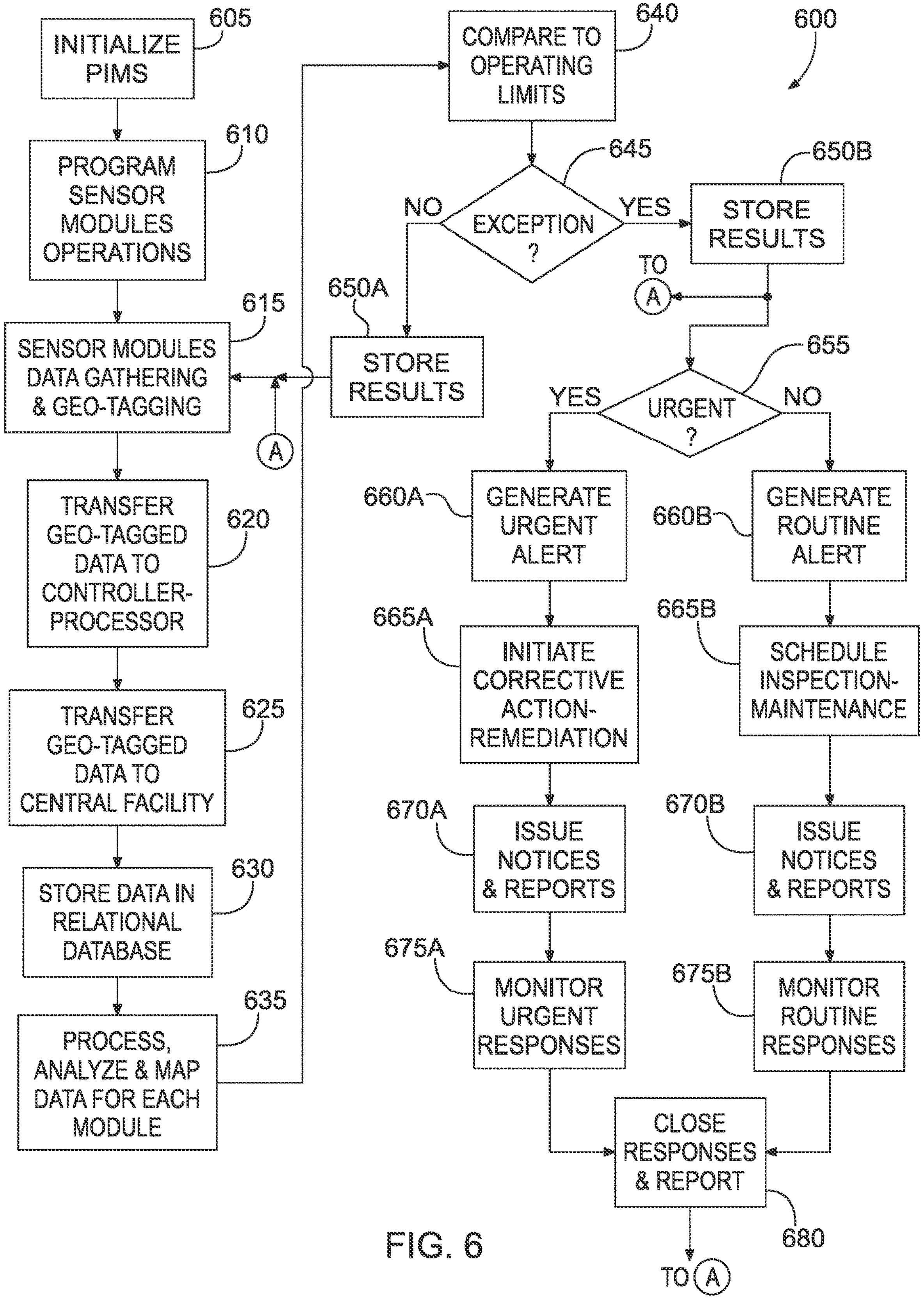
FIG. 6 is a schematic block flow diagram illustrating an example operation of the example pipeline monitoring system.

FIG. 6 is a schematic block flow diagram illustrating an example of the operation 600 of the example pipeline monitoring system 100. Operation or process 600 commences with turning on and initializing 605 PIMS 100 including central facility 300 and the elements thereof, and the various sensor modules 200-200N of PIMS 100. Initializing 605 can also include reporting the unique IP address and GPS location of each sensor module and comparing that data to the corresponding data that is stored in the database of central facility 300 to verify proper operation thereof, communication therewith and physical placement thereof.

Operation of the various sensor modules 200-200N is programmed 610, e.g., as to the times of their operation (which may be periodic or continuously), the duration in time over which they operate (e.g., per minute, per hour, per day and the like), the frequency at which various sensor devices 220-245 thereof measure data relating to the element of pipeline system 110 at which they are disposed (which frequency may be different for different sensor modules 200 and/or for different ones of sensor devices 220-245 thereof). The programming 610 of sensor modules 200 can differ depending upon where on pipeline system 110 each is disposed. For example, those disposed near to valves can be programmed differently than those disposed near pumps and pumping stations, and differently from those disposed upon relatively long lengths of pipeline, and the like.

Once programmed 610, sensor modules 200 commence gathering data 615 in accordance with their programming 610 relating to their sensor devices 220-245 and geo-tag that data by associating it with location data from location device (GPS) 280 as well as the date and time data therefrom, and the IP address of that module 200. The geo-tagged sensor data is transferred 620 to controller processor 210 and stored 620 in memory 210M thereof and is transmitted 625 via communication device 260 and networks 160N to central facility 300, being received by communication device 360 thereof.

The geo-tagged data received at central facility is stored 630 in a relational database 320 under control of server(s) 310, e.g., in memory 320 thereof or in related storage 320. Processing 635, analyzing 635 and/or mapping 635 of the stored geo-tagged data from each module provides processed data that represents the conditions of and at particular elements, parts and/or components of pipeline system 110 at specific times and/or between specific times which are compared 640 with predetermined standards and acceptable limits for safe operations of such particular elements, parts and/or components.

Preferably, server(s) 310 and memory/storage 320 contain standardized exception data defining normally expected signatures for expected and/or acceptable levels of flow direction and volume under the programmed operating conditions in the pipeline system, of wall thicknesses, of magnitude and frequencies of vibrations, sounds and acceleration, with which measured data is compared to determine whether any exceptions exist, thereby causing alerts and notifications to be generated for initiating responses to appropriately address such exceptions.

Further, server(s) 310 and memory/storage 320 preferably also contain standardized urgent exception data defining when an exception that is determined to exist is sufficiently in excess of standard exception data levels as to present a clear danger to safe operation of the pipeline whereupon such exception is designated an urgent exception, thereby causing urgent alerts and notifications to be generated for initiating urgent immediate responses to appropriately address such urgent exceptions.

The results of such comparisons 640 are handled 645 differently depending upon whether the result is or is not an exception 645 through comparison with predetermined acceptable and not acceptable parameters and limits. If the result is not an exception 645, it is directed 645—NO for being stored 650A and the operation for that sensor module 200 reverts to data gathering 615. If the result is an exception 645, it is directed 645—YES for being stored 650B and the operation for that sensor module 200 reverts to data gathering 615 while the stored result of comparison 645 is further compared 655 against a second set of predetermined urgent and not urgent parameters and limits.

If the comparison result which is an exception is sufficiently outside of limits so that it is considered as being urgent 655—YES, then the branch 660A-675A for urgent exceptions is followed, whereas if the comparison result which is an exception but is not so far outside of limits so that it is considered as not being urgent 655—NO, then the branch 660B-675B for non-urgent exceptions is followed. Conditions that are urgent include, e.g., those where a leak, spill or other breach has occurred or is imminent, or where tampering and/or theft of product is apparent since those actions could lead to a leak, spill or other breach.

While the comparisons for exceptions 645 and for urgent—non-urgent 655 conditions are preferably performed by the servers 310 of central facility 300, they may be augmented, overseen and/or performed in whole or in part by human personnel. Such personnel can include, e.g., technical managers, pipeline engineers, operations supervisors and/or managers, maintenance supervisors, and/or other personnel who have the necessary training and experience to quickly and accurately review, consider and act on responding to exceptions 645 in general and to urgent exceptions 655 in particular.

Branch 660A-675A for urgent exceptions includes generating 660A and distributing 660A an urgent alert via displays 340, human interface(s) 350 and communication system 360 of central facility 300 to appropriate organizations, agencies and/or personnel who initiate 665A urgent actions, e.g., corrective action if no leak, spill or other breach has occurred, but is imminent, and/or remediation if a leak, spill or other breach has occurred. Notices and/or reports are issued 670A immediately and/or quickly depending upon the severity and urgency of the exception condition being responded to. The urgent responses initiated 665A are monitored 675A for progress and their being completed properly and timely whereupon the urgent response item is closed 680 and reported 680 and operation reverts to sensor module 200 data gathering 615.

Branch 660B-675B for non-urgent exceptions includes generating 660B and distributing 660B a routine alert via displays 340, human interface(s) 350 and communication system 360 of central facility 300 to appropriate organizations, agencies and/or personnel who schedule 665B initiation of routine actions, e.g., inspections, corrective maintenance and/or repair action since no leak, spill or other breach has occurred. Routine notices and/or reports are issued 670B quickly and/or on a routine schedule depending upon the nature of the exception condition being responded to. The routine responses initiated 665B are monitored 675B for progress and their being completed properly and timely whereupon the routine response item is closed 680 and reported 680 and operation reverts to sensor module 200 data gathering 615.

A monitoring system for a pipeline system, wherein the pipeline system includes a plurality of elements, the elements thereof including: any one of more of a well, a field, a platform, a derrick, extraction equipment, a plant, a storage tank, a refinery, a chemical plant, a manufacturing facility, as well as associated pipes, pipelines, pumps, pumping stations, valves, conduits, storage containers, and combinations thereof; the monitoring system may comprise: a plurality of sensor modules each disposed proximate to an element of the pipeline system, each sensor module comprising: one or more sensor units each including a plurality of sensors including a flow sensor for sensing flow of a material in the pipeline element, a thickness sensor for measuring thickness of a wall of the pipeline element, a vibration sensor for measuring vibration at the pipeline element, and a leak sensor for detecting leaks of media near to the pipeline element, each sensor unit being disposed closely adjacent to the element of the pipeline; a controller processor coupled to each of the one or more sensor units and configured to receive data sensed by the plurality of sensors thereof, a location device for providing location data representative of the location of the sensor module and date-time data; wherein the controller processor associates the location data and the date-time data with data sensed by the plurality of sensors, whereby the data sensed by the plurality of sensors is geo-tagged; a communication device for transmitting the geo-tagged data sensed by the plurality of sensors and for receiving control commands; and a central facility comprising: a communication device for receiving the transmitted geo-tagged data sensed by the plurality of sensors of sensor modules and for transmitting control commands to the plurality of sensor modules; one or more servers configured to process the received geo-tagged data sensed by the plurality of sensors of sensor modules and to store the received geo-tagged data sensed by the plurality of sensors thereof in a relational database; wherein memory associated with the one or more servers contains the relational database and the geo-tagged sensor data stored therein, the memory further containing standardized exception data relating to safe operation of the pipeline system; wherein the one or more servers are configured to process the geo-tagged data sensed by the plurality of sensors to: analyze data from the flow sensors to determine the direction and velocity of the flow of material in the element and to compare the determined direction and velocity of the flow of material to standardized flow exception data therefor; analyze data from the thickness sensors to determine the thickness of the wall of the element and to compare the determined thickness of the wall to standardized thickness exception data therefor; analyze data from the vibration sensors to determine the magnitude and frequencies of vibration at the element and to compare the determined magnitude and frequencies of the vibration to standardized vibration exception data therefor; analyze conductivity data from the leak sensors to determine the occurrence of a leak of material in the pipeline element and to compare the determined conductivity to standardized conductivity exception data therefor; wherein the one or more servers are configured to process results of comparing the determined data to standardized exception data to determine when an exception exists, and a display and/or human interface device, wherein when an exception exists, the one or more servers generate an alert therefrom and communicate the alert via the display, the human interface device and/or the communication device of the central facility.

The controller processor of the sensor module may be coupled to the one or more sensor units by a physical electrical conductor or by a wireless communication link. The monitoring system wherein a pipeline element has a top, a bottom and a side: wherein a first sensor unit thickness sensor is disposed on top of the pipeline element and a second sensor unit thickness sensor is disposed on the bottom of the pipeline element; and/or wherein a first sensor unit thickness sensor is disposed on top of the pipeline element, a second sensor unit thickness sensor is disposed on the bottom of the pipeline element, and a third sensor unit thickness sensor is disposed on the side of the pipeline element, whereby corrosion of the pipeline element at it top, at its bottom, and/or at its side is determined from thickness data sensed by the respective thickness sensors of the first, second and/or third sensor units. The location device may include one or more global positioning system devices including a US GPS system device, a Russian GLONASS system device, a European Galileo system device, an Indian IRNSS system device, or a Chinese BDS system device, or any combination thereof. The communication devices of the sensor modules and the communication device of the central facility may communicate via one or more communication networks including a cellular network, satellite communication a Wi-If network, LoRAN, a wireless mesh network, and/or any combination thereof. The one or more servers configured to process the geo-tagged data sensed by the plurality of sensors may: analyze data from the flow sensors that is geo-tagged at a predetermined time, analyze data from the thickness sensors that is geo-tagged at a predetermined time, and/or analyze data from the vibration sensors that is geo-tagged at a predetermined time, wherein the one or more servers determine when an exception exists therein at the predetermined time. The one or more servers configured to process the geo-tagged data sensed by the plurality of sensors may: analyze data from the flow sensors that is geo-tagged at first and second predetermined times, analyze data from the thickness sensors that is geo-tagged at the first and second predetermined times, and analyze data from the vibration sensors that is geo-tagged at the first and second predetermined times; wherein the standardized flow exception data, the standardized thickness exception data and the standardized vibration exception data have exception data limits for rates of change of flow, of thickness and of vibration, respectively; and wherein the one or more servers determine when an exception exists from the rate of change of the data geo-tagged at the first and second predetermined times. The one or more servers configured to process the geo-tagged data sensed by the plurality of sensors may: analyze data from the thickness sensors that is geo-tagged at a first plurality of predetermined times to determine a rate of change of wall thickness as a function of time; analyze data from the vibration sensors that is geo-tagged at a second plurality of predetermined times to determine characteristics of vibration data in the frequency domain to determine vibration-inducing events occurring at a given time and/or over a period of time; analyze data from the vibration sensors that is geo-tagged at a third plurality of predetermined times to determine characteristics of vibration data in the time domain to determine vibration-inducing events occurring at a given time and/or over a period of time; wherein the standardized thickness exception data and the standardized vibration exception data have exception data limits for rates of change of thickness and of vibration, respectively; and wherein the one or more servers determine when an exception exists from the rate of change of the data geo-tagged at the first, second and third predetermined times. The flow sensor may include an ultrasonic flow sensor; or the thickness sensor may include an ultrasonic sensor and/or a magnetic sensor; and/or the vibration sensor may include a sound transducer, a shock transducer, a vibration transducer, a vibration transducer, and/or an accelerometer. The pipeline element has a top and a bottom, wherein a leak detection cable extends from the leak sensor, and wherein: the leak detection cable is disposed along the top of the pipeline element for when the pipeline element carries a gaseous media; or the leak detection cable is disposed along the bottom of the pipeline element for when the pipeline element carries a liquid media; a first leak detection cable is disposed along the top of the pipeline element and a second leak detection cable is disposed along the bottom of the pipeline element for when the pipeline element carries a gaseous media and/or a liquid media. The pipeline element has a top and a bottom, wherein the leak sensor of at least one sensor unit may include: one or more electrical cables each including a plurality of electrical wires, each having a distal end that is disposed adjacent to the top and/or bottom of the pipeline element and having a proximal end that is connected to the at least one sensor unit or to the distal end of another of the one or more electrical cables, whereby the one or more cables can be daisy-chained to extend the distance between the distal ends thereof and the sensor unit; and an electrical conductivity measuring device at the distal end of the cable having a pair of electrical conductors in physical contact within a rubber or rubber-like material that absorbs the media carried in the pipeline element, wherein the pair of electrical conductors break electrical contact when the material absorbs the media, wherein each measuring device is connected to a different one of the plurality of electrical wires of the electrical cable for detecting leaks proximate the respective ends of each electrical wire. The sensor unit may further include: a temperature sensor; a strain gage sensor; a natural gas sensor; a gas sensor; and/or a galvanic potential sensor. The one or more servers may be configured to process geo-tagged data sensed by the temperature sensor; strain gage sensor; natural gas sensor; gas sensor; and/or galvanic potential sensor to: analyze data from the temperature sensor to determine the temperature of the element and/or of the material in the element at a predetermined time and/or at predetermined times, and to compare the analyzed temperature to standardized temperature exception data therefor; analyze data from the gas sensor and/or the natural gas sensor to determine the presence of gas and/or natural gas and the location thereof, and to compare the analyzed gas and/or natural gas data standardized gas exception data therefor; analyze data from the strain gage sensor to determine the strain in the element at a predetermined time and/or at predetermined times and to compare the analyzed strain to standardized strain exception data therefor; and/or analyze data from the galvanic potential sensor to determine the galvanic potential at the element at a predetermined time and/or at predetermined times and to compare the analyzed galvanic potential of the element to standardized galvanic potential exception data therefor; wherein the one or more servers are configured to process results of comparing the analyzed data to standardized exception data to determine when an exception exists at the predetermined time and/or at the predetermined times. The standardized exception data relating to safe operation of the pipeline system that is stored in the memory of the central facility may include standardized routine exception data and standardized urgent exception data, wherein the one or more servers are configured to compare the exceptions to the standardized routine exception data and to the standardized urgent exception data when an exception exists, and to generate a routine alert when a routine exception exists and to generate an urgent alert when an urgent exception exists. The sensor modules and sensor units may be physically attached to elements of the pipeline system, wherein the sensor modules and sensor units are encapsulated and are bonded to the pipeline elements with encapsulating materials and bonding materials that block moisture and corrosive gas from the contact area between the sensor module and sensor unit and the pipeline element whereat each is attached.

A monitoring system for a pipeline system, wherein the pipeline system includes a plurality of elements, the elements thereof including: any one of more of a well, a field, a platform, a derrick, extraction equipment, a plant, a storage tank, a refinery, a chemical plant, a manufacturing facility, as well as associated pipes, pipelines, pumps, pumping stations, valves, conduits, storage containers, and combinations thereof; the monitoring system may comprise: a multiplicity of thickness sensors disposed adjacent tops and/or bottoms of elements of the pipeline system, including bottoms of storage containers, for measuring the thickness of walls of the pipeline elements, including storage containers, over periods of time; a multiplicity of vibration sensors disposed adjacent elements of the pipeline system for measuring vibration data at the pipeline elements over periods of time, the vibration data including frequency domain data and time domain data; plural controller processors wherein each one thereof is coupled to a respective group of sensors, each group of sensors including ones of the multiplicity of thickness sensors and ones of the multiplicity of vibration sensors, each controller processor being configured to receive data sensed by the respective group of sensors coupled thereto; plural location devices wherein each one thereof is coupled to a respective one of the plural controller processors for providing location data representative of the location thereof and date-time data; wherein each of the plural controller processors associates the location data and the date-time data thereof with data sensed by the ones of the multiplicity of thickness sensors and the ones of the multiplicity of vibration sensors of its respective group of sensors, whereby the data sensed by the ones of the multiplicity of thickness sensors and the ones of the multiplicity of vibration sensors is geo-tagged; plural communication devices wherein each one thereof is coupled to a respective one of the plural controllers processors for transmitting the geo-tagged data sensed by the ones of the multiplicity of thickness sensors and the ones of the multiplicity of vibration sensors associated therewith and for receiving control commands; and a central facility may comprise: a communication device for receiving the geo-tagged data from the multiplicity of thickness sensors and from the multiplicity of vibration sensors that is transmitted by the plural communication devices and for transmitting control commands thereto; one or more servers configured to process the received geo-tagged data from the multiplicity of thickness sensors and from the multiplicity of vibration sensors and to store the received geo-tagged data from the multiplicity of thickness sensors and from the multiplicity of vibration sensors in a relational database; wherein memory associated with the one or more servers contains the relational database and the geo-tagged sensor data from the multiplicity of thickness sensors and from the multiplicity of vibration sensors stored therein, the memory further containing standardized exception data relating to safe operation of the pipeline system; wherein the one or more servers are configured to process the geo-tagged data from the multiplicity of thickness sensors and from the multiplicity of vibration sensors to: analyze data from each of the thickness sensors to determine the thickness of the wall of the element and the rate of change in the thickness thereof as a function of time, and to compare the determined thickness of the wall and the rate of change thereof to standardized thickness exception data therefor; analyze data from each of the vibration sensors to determine the magnitudes and frequencies and times of vibration at the element and to compare the determined magnitudes and frequencies of the vibration in the frequency domain and/or the determined magnitudes and times thereof in the time domain to standardized vibration exception data therefor; wherein the one or more servers are configured to process results of comparing the determined data to standardized exception data to determine when an exception exists, and a display and/or human interface device, wherein when an exception exists, the one or more servers generate an alert therefrom and communicate the alert via the display, the human interface device and/or the communication device of the central facility.

The monitoring system may further comprise: plural flow sensors for sensing a flow of material in pipeline elements and/or plural leak sensors for detecting leaks of media near to the pipeline elements, each flow sensor and each leak sensor being disposed adjacent to an element of the pipeline; wherein each of the plural flow sensors and each of the plural leak sensors is coupled to one of the plural controller processors wherein the flow data sensed by each flow sensor and the leak data sensed by each leak detector is geo-tagged, whereby the geo-tagged flow data and the geo-tagged leak data is communicated to the servers of the central facility; wherein the one or more servers are configured to process the geo-tagged data from the plural flow sensors and from the plural leak sensors to: analyze data from the flow sensors to determine the direction and velocity of the flow of material in the element and to compare the determined direction and velocity of the flow of material to standardized flow exception data therefor; analyze conductivity data from the leak sensors to determine the occurrence of a leak of material in the pipeline element and to compare the determined conductivity to standardized conductivity exception data therefor; wherein the one or more servers are configured to process results of comparing the determined data to the standardized exception data to determine when an exception exists, and when an exception exists, the one or more servers generate an alert therefrom and communicate the alert via the display, the human interface device and/or the communication device of the central facility.

Each of the controller processors may be coupled to one or more sensors by a physical electrical conductor or by a wireless communication link. The pipeline element has a top, a bottom and a side: wherein a first thickness sensor is disposed on top of the pipeline element and a second thickness sensor is disposed on the bottom of the pipeline element; and/or wherein a first thickness sensor is disposed on top of the pipeline element, a second thickness sensor is disposed on the bottom of the pipeline element, and a third thickness sensor is disposed on the side of the pipeline element, whereby corrosion of the pipeline element at it top, at its bottom, and/or at its side is determined from thickness data sensed by the first, second and/or third thickness sensors. The location devices may include one or more global positioning system devices including a US GPS system device, a Russian GLONASS system device, a European Galileo system device, an Indian IRNSS system device, or a Chinese BDS system device, or any combination thereof. Each of the plural communication devices and the communication device of the central facility may communicate via one or more communication networks including a cellular network, satellite communication a Wi-If network, LoRAN, a wireless mesh network, and/or any combination thereof. The one or more servers configured to process the geo-tagged data may: analyze data from the thickness sensors that is geo-tagged at a predetermined time, and/or analyze data from the vibration sensors that is geo-tagged at a predetermined time, analyze data from the flow sensors that is geo-tagged at a predetermined time, and/or analyze data from the leak sensors that is geo-tagged at a predetermined time, wherein the one or more servers determine when an exception exists therein at the predetermined time. The one or more servers configured to process the geo-tagged data may: analyze data from the thickness sensors that is geo-tagged at the first and second predetermined times, analyze data from the vibration sensors that is geo-tagged at the first and second predetermined times, analyze data from the flow sensors that is geo-tagged at first and second predetermined times, and/or analyze data from the flow sensors that is geo-tagged at first and second predetermined times; wherein the standardized thickness exception data, the standardized vibration exception data, the standardized flow exception data, and/or the standardized leak exception data, have exception data limits for rates of change of thickness, of vibration, of flow and/or of leak, respectively; and wherein the one or more servers determine when an exception exists from the rate of change of the data geo-tagged at the first and second predetermined times. The one or more servers configured to process the geo-tagged data sensed by the plurality of sensors may: analyze data from the thickness sensors that is geo-tagged at a first plurality of predetermined times to determine a rate of change of wall thickness as a function of time; analyze data from the vibration sensors that is geo-tagged at a second plurality of predetermined times to determine characteristics of vibration data in the frequency domain to determine vibration-inducing events occurring at a given time and/or over a period of time; analyze data from the vibration sensors that is geo-tagged at a third plurality of predetermined times to determine characteristics of vibration data in the time domain to determine vibration-inducing events occurring at a given time and/or over a period of time; wherein the standardized thickness exception data and the standardized vibration exception data have exception data limits for rates of change of thickness and of vibration, respectively; and wherein the one or more servers determine when an exception exists from the rate of change of the data geo-tagged at the first, second and third predetermined times. The thickness sensor may include an ultrasonic sensor and/or a magnetic sensor; the vibration sensor may include a sound transducer, a shock transducer, a vibration transducer, a vibration transducer, and/or an accelerometer; the flow sensor may include an ultrasonic flow sensor; and/or the leak sensor may include two electrical conductors in a material that expands when it absorbs a media carried by the pipeline system. The pipeline element has a top and a bottom, wherein a leak detection cable extends from the leak sensor, and wherein: the leak detection cable may be disposed along the top of the pipeline element when the pipeline element carries a gaseous media; or the leak detection cable is disposed along the bottom of the pipeline element for when the pipeline element carries a liquid media; a first leak detection cable may be disposed along the top of the pipeline element and a second leak detection cable is disposed along the bottom of the pipeline element for when the pipeline element carries a gaseous media and/or a liquid media. The pipeline element has a top and a bottom, wherein the leak sensor may include: one or more electrical cables each including a plurality of electrical wires, each having a distal end that is disposed adjacent to the top and/or bottom of the pipeline element and having a proximal end that is connected to a respective controller processor or to the distal end of another of the one or more electrical cables, whereby the one or more cables can be daisy-chained to extend the distance between the distal ends thereof and the controller processor; and an electrical conductivity measuring device at the distal end of the cable having a pair of electrical conductors in physical contact within a rubber or rubber-like material that absorbs the media carried in the pipeline element, wherein the pair of electrical conductors break electrical contact when the material absorbs the media, wherein each measuring device is connected to a different one of the plurality of electrical wires of the electrical cable for detecting leaks proximate the respective ends of each electrical wire. The monitoring system may further include: plural temperature sensors; plural strain gage sensors; plural natural gas sensors; plural gas sensors; and/or plural galvanic potential sensors, wherein each one of the foregoing sensors is coupled to one of the plural controller processors. The one or more servers may be configured to process geo-tagged data sensed by the plural temperature sensors; plural strain gage sensors; plural natural gas sensors; plural gas sensors; and/or plural galvanic potential sensors to: analyze data from the temperature sensor to determine the temperature of the element and/or of the material in the element at a predetermined time and/or at predetermined times, and to compare the analyzed temperature to standardized temperature exception data therefor; analyze data from the gas sensor and/or the natural gas sensor to determine the presence of gas and/or natural gas and the location thereof, and to compare the analyzed gas and/or natural gas data standardized gas exception data therefor; analyze data from the strain gage sensor to determine the strain in the element at a predetermined time and/or at predetermined times and to compare the analyzed strain to standardized strain exception data therefor; and/or analyze data from the galvanic potential sensor to determine the galvanic potential at the element at a predetermined time and/or at predetermined times and to compare the analyzed galvanic potential of the element to standardized galvanic potential exception data therefor; wherein the one or more servers are configured to process results of comparing the analyzed data to standardized exception data to determine when an exception exists at the predetermined time and/or at the predetermined times. The standardized exception data relating to safe operation of the pipeline system that is stored in the memory of the central facility may include standardized routine exception data and standardized urgent exception data, wherein the one or more servers are configured to compare the exceptions to the standardized routine exception data and to the standardized urgent exception data when an exception exists, and to generate a routine alert when a routine exception exists and to generate an urgent alert when an urgent exception exists. The sensors may be physically attached to elements of the pipeline system, and wherein ones of the sensors are encapsulated and are bonded to the pipeline elements with encapsulating materials and bonding materials that block moisture and corrosive gas from the contact area between the sensor and the pipeline element whereat each is attached.

As used herein, the terms “about,” “approximate” and/or “approximately” mean that dimensions, sizes, formulations, parameters, shapes and other quantities and characteristics are not and need not be exact, but may be approximate and/or larger or smaller, as desired, reflecting tolerances, conversion factors, rounding off, measurement error and the like, judgment, and other factors known to those of ordinary skill in the art. In general, a dimension, size, formulation, parameter, shape or other quantity or characteristic is “about” or “approximate” or “substantial” or “substantially” whether or not expressly stated to be such. It is noted that embodiments of very different sizes, shapes and dimensions may employ the described arrangements.

Although terms such as “front,” “back,” “rear,” “side,” “end,” “top,” “bottom,” “up,” “down,” “left,” “right,” “upward,” “downward,” “forward,” “backward,” “under” and/or “over,” “vertical,” “horizontal,” and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term “and/or” encompasses both the conjunctive and the disjunctive cases, so that a phrase in the form “A and/or B” encompasses “A” or “B” or “A and B.” Likewise, a phrase in the form “A, B and/or C” or a phrase in the form “A and/or B and/or C” includes “A,” “B,” “C,” “A and B,” “A and C,” “B and C,” and “A and B and C.” In addition, the term “at least one of” one or more elements is intended to include one of any one of the elements, more than one of any of the elements, and two or more of the elements up to and including all of the elements, and so, e.g., phrases in the form “at least one of A, B and C” include “A,” “B,” “C,” “A and B,” “A and C,” “B and C,” and “A and B and C.”

As used herein, the term “predetermined” means determined in advance or before hand with respect to whatever the term pertains to. The term may be used with respect to a physical object or thing and/or with respect to an intangible thing, e.g., a signal or data, and the like. Examples thereof may include a fixed value, position, condition and/or limit, however, predetermined is not limited to a fixed value, position, condition and/or limit. A predetermined value, position, condition and/or limit may change or otherwise vary over time, over a sequence and/or over a randomized series of values, positions, conditions and/or limits.

As used herein, the term “plurality” means plural, two or greater in number of whatever the term pertains to, i.e. more than one. The term may be used with respect to a physical object or thing and/or with respect to an intangible thing, e.g., a signal or data, and the like. Examples thereof may include a fixed or movable thing, a fixed value, a changeable value, position, condition and/or limit, and the like. “Multiple” and “multiplicity” generally refer to a large quantity of things such as one hundred or more things.

As used herein, the terms “substantial” and “substantially” mean that the thing referred to as being “substantial” or “substantially” is sufficiently similar in form and/or function as to usable in the invention in a manner that is encompassed or suggested by the description and/or claims herein, and/or an equivalent thereof. The terms “substantial” and “substantially” can include and/or can be in addition to the meaning of the terms “about,” “approximate” and/or “approximately” herein.

As used herein the term “pipeline” may include any equipment employed in the production, processing, handling, transport, storage, dispensing and/or usage of any material that may be carried or contained by such equipment. As such, a pipeline may include a typical hollow cylindrical pipe, irrespective of the material of which it is constructed and the number of layers in its walls, as well as ducts, valves, vanes, pumps, motors, restrictions, diverters, tanks, elbows, splitters, couplings, and other equipment associated therewith. Examples of materials that may be carried and/or contained by such “pipelines” include, with out limitation, oil, gas, water, chemicals, sludge, slurries, sewage, and other media able to be carried, processed and/or stored thereby.

While steel is a common material from which pipes, pipelines and related equipment are made, PIMS 100 and sensor modules 200 thereof are suitable for use with pipes, pipelines and equipment made of other metals such as copper, aluminum, cast iron, carbon steel, stainless steel and alloy steel pipes, and/or plastics, whether used for above ground, buried, underground, submerged, or other pipeline situations.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, straps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, an adhesive, a clasp, a clip, a latch, and the like.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof may or may not be intended to be exact synonyms, but may also encompass some similar things and some different things, and those terms are used interchangeably herein. While the term "connected" as indicated by its context may be used generally to refer to elements that have a direct electrical and/or physical contact to each other, whereas the term "coupled" as indicated by its context may be used generally to refer to elements that have an indirect electrical and/or indirect physical contact with each other, e.g., via one or more intermediate elements, so as to cooperate and/or interact with each other, and may include elements in direct contact as well.

While the present invention has been described in terms of the foregoing example embodiments, variations within the scope and spirit of the present invention as defined by the claims following will be apparent to those skilled in the art. For example, while example sensor modules 200 and sensor units 220 are described with a substantially complete array of sensors, different sensor modules 200 and/or sensor units 220 may be implemented in modular fashion so that different sensor modules and sensors have interchangeable parts so that each can be "customized" for a particular use or application or location.

Further, different "standard" sensor modules 200 and/or sensor units 220 having predetermine configurations may be employed, preferably within a reasonable number of different standard types to balance the cost savings from some units having a simpler configuration with the costs of stocking and inventorying different standard types. For example, PIMS 100 can include plural sensor units 220 disposed for monitoring transportation vehicles such as trucks, trains, ships, and the like, with sensor module 220 elements being disposed at various parts of such vehicles for monitoring conditions thereat, while at least the remainder of sensor module 200 provides electrical power 290 and communicates via device 260 with a central facility 300.

Sensor modules 200 may be configured to include a fewer or greater number of sensors, or to activate a fewer or greater number of sensors, as may be desirable for any particular locations or environments. For example, because it may be desired to dispose leak sensors 235 more frequently along longer lengths of a pipe or pipeline than is desired for other sensors, a sensor module 200 may be configured to contain one or more leak sensors 235. Similarly, it may be desired in a particular installation to configure a sensor module 200 or a sensor unit 220 to include various combinations of the described sensors and/or other sensors in configurations that are different from the example configurations described herein.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

Standard characters and symbols that may be used herein may include:

DOCX: ± ≤ ≥ ≈ Å µ⊕ ⊖ ½ ¼ ⅓ $™ ® © § √ √ ASCHI™ § © ® ° ±µ ¶ Å ★

GRK: Aα β Γ ΔΕ∈ Zη Θθ Δλ Mμ Nν Ππ Pρ Σσ T ΦφXχ Ψψ Ωω

NTRFont: ( ) * + − < = > ?[ ] ™ § © ® µ ¼ ½ ¾ Å @ ! " # $ % & ' ( ) + − / @ ~

KYBDCAB:™ ~ + −! @ # $ % ˆ & * ( ) − _ =+ [ ] { } [EndStandard].

What is claimed is:

1. A monitoring system for a pipeline system, wherein the pipeline system includes a plurality of elements, the elements thereof including: any one of more of a well, a field, a platform, a derrick, extraction equipment, a plant, a storage tank, a refinery, a chemical plant, a manufacturing facility, as well as associated pipes, pipelines, pumps, pumping stations, valves, conduits, storage containers, and combinations thereof;

the monitoring system comprising:

a plurality of sensor modules each disposed proximate to an element of the pipeline system, each sensor module comprising:

one or more sensor units each including a plurality of sensors including a flow sensor for sensing flow of a material in the pipeline element, a thickness sensor for measuring thickness of a wall of the pipeline element, a vibration sensor for measuring vibration at the pipeline element, and a leak sensor for detecting leaks of media near to the pipeline element, each sensor unit being disposed closely adjacent to the element of the pipeline;

a controller processor coupled to each of the one or more sensor units and configured to receive data sensed by the plurality of sensors thereof, a location device for providing location data representative of the location of the sensor module and date-time data;

wherein the controller processor associates the location data and the date-time data with data sensed by the plurality of sensors, whereby the data sensed by the plurality of sensors is geo-tagged;

a communication device for transmitting the geo-tagged data sensed by the plurality of sensors and for receiving control commands; and a central facility comprising:

a communication device for receiving the transmitted geo-tagged data sensed by the plurality of sensors of sensor modules and for transmitting control commands to the plurality of sensor modules;

one or more servers configured to process the received geo-tagged data sensed by the plurality of sensors of sensor modules and to store the received geo-tagged data sensed by the plurality of sensors thereof in a relational database;

wherein memory associated with the one or more servers contains the relational database and the geo-tagged sensor data stored therein, the memory further containing standardized exception data relating to safe operation of the pipeline system;

wherein the one or more servers are configured to process the geo-tagged data sensed by the plurality of sensors to:

analyze data from the flow sensors to determine the direction and velocity of the flow of material in the element and to compare the determined direction and velocity of the flow of material to standardized flow exception data therefor;

analyze data from the thickness sensors to determine the thickness of the wall of the element and to compare the determined thickness of the wall to standardized thickness exception data therefor;

analyze data from the vibration sensors to determine the magnitude and frequencies of vibration at the element and to compare the determined magnitude and frequencies of the vibration to standardized vibration exception data therefor;

analyze conductivity data from the leak sensors to determine the occurrence of a leak of material in the pipeline element and to compare the determined conductivity to standardized conductivity exception data therefor;

wherein the one or more servers are configured to process results of comparing the determined data to standardized exception data to determine when an exception exists, and a display and/or human interface device, wherein when an exception exists, the one or more servers generate an alert therefrom and communicate the alert via the display, the human interface device and/or the communication device of the central facility.

2. The monitoring system of claim 1 wherein the controller processor of the sensor module is coupled to the one or more sensor units by a physical electrical conductor or by a wireless communication link.

3. The monitoring system of claim 1 wherein a pipeline element has a top, a bottom and a side:

wherein a first sensor unit thickness sensor is disposed on top of the pipeline element and a second sensor unit thickness sensor is disposed on the bottom of the pipeline element; and/or wherein a first sensor unit thickness sensor is disposed on top of the pipeline element, a second sensor unit thickness sensor is disposed on the bottom of the pipeline element, and a third sensor unit thickness sensor is disposed on the side of the pipeline element, whereby corrosion of the pipeline element at it top, at its bottom, and/or at its side is determined from thickness data sensed by the respective thickness sensors of the first, second and/or third sensor units.

4. The monitoring system of claim 1 wherein the location device includes one or more global positioning system devices including a US GPS system device, a Russian GLONASS system device, a European Galileo system device, an Indian IRNSS system device, or a Chinese BDS system device, or any combination thereof.

5. The monitoring system of claim 1 wherein the communication devices of the sensor modules and the communication device of the central facility communicate via one or more communication networks including a cellular network, satellite communication a Wi-If network, LoRAN, a wireless mesh network, and/or any combination thereof.

6. The monitoring system of claim 1 wherein the one or more servers configured to process the geo-tagged data sensed by the plurality of sensors:

analyze data from the flow sensors that is geo-tagged at a predetermined time, analyze data from the thickness sensors that is geo-tagged at a predetermined time, and/or analyze data from the vibration sensors that is geo-tagged at a predetermined time, wherein the one or more servers determine when an exception exists therein at the predetermined time.

7. The monitoring system of claim 1 wherein the one or more servers configured to process the geo-tagged data sensed by the plurality of sensors:

analyze data from the flow sensors that is geo-tagged at first and second predetermined times, analyze data from the thickness sensors that is geo-tagged at the first and second predetermined times, and analyze data from the vibration sensors that is geo-tagged at the first and second predetermined times;

wherein the standardized flow exception data, the standardized thickness exception data and the standardized vibration exception data have exception data limits for rates of change of flow, of thickness and of vibration, respectively; and wherein the one or more servers determine when an exception exists from the rate of change of the data geo-tagged at the first and second predetermined times.

8. The monitoring system of claim 1 wherein the one or more servers configured to process the geo-tagged data sensed by the plurality of sensors:

analyze data from the thickness sensors that is geo-tagged at a first plurality of predetermined times to determine a rate of change of wall thickness as a function of time;

analyze data from the vibration sensors that is geo-tagged at a second plurality of predetermined times to determine characteristics of vibration data in the frequency domain to determine vibration-inducing events occurring at a given time and/or over a period of time;

analyze data from the vibration sensors that is geo-tagged at a third plurality of predetermined times to determine characteristics of vibration data in the time domain to determine vibration-inducing events occurring at a given time and/or over a period of time;

wherein the standardized thickness exception data and the standardized vibration exception data have exception data limits for rates of change of thickness and of vibration, respectively; and wherein the one or more servers determine when an exception exists from the rate of change of the data geo-tagged at the first, second and third predetermined times.

9. The monitoring system of claim 1 wherein:

the flow sensor includes an ultrasonic flow sensor; or the thickness sensor includes an ultrasonic sensor and/or a magnetic sensor; and/or the vibration sensor includes a sound transducer, a shock transducer, a vibration transducer, a vibration transducer, and/or an accelerometer.

10. The monitoring system of claim 1 wherein a pipeline element has a top and a bottom, wherein a leak detection cable extends from the leak sensor, and wherein:

the leak detection cable is disposed along the top of the pipeline element for when the pipeline element carries a gaseous media; or the leak detection cable is disposed along the bottom of the pipeline element for when the pipeline element carries a liquid media;

a first leak detection cable is disposed along the top of the pipeline element and a second leak detection cable is disposed along the bottom of the pipeline element for when the pipeline element carries a gaseous media and/or a liquid media.

11. The monitoring system of claim 1 wherein a pipeline element has a top and a bottom, wherein the leak sensor of at least one sensor unit includes:

one or more electrical cables each including a plurality of electrical wires, each having a distal end that is disposed adjacent to the top and/or bottom of the pipeline element and having a proximal end that is connected to the at least one sensor unit or to the distal end of another of the one or more electrical cables, whereby the one or more cables can be daisy-chained to extend the distance between the distal ends thereof and the sensor unit; and an electrical conductivity measuring device at the distal end of the cable having a pair of electrical conductors in physical contact within a rubber or rubber-like material that absorbs the media carried in the pipeline element, wherein the pair of electrical conductors break electrical contact when the material absorbs the media, wherein each measuring device is connected to a different one of the plurality of electrical wires of the electrical cable for detecting leaks proximate the respective ends of each electrical wire.

12. The monitoring system of claim 1 wherein the standardized exception data relating to safe operation of the pipeline system that is stored in the memory of the central facility includes standardized routine exception data and standardized urgent exception data, wherein the one or more servers are configured to compare the exceptions to the standardized routine exception data and to the standardized urgent exception data when an exception exists, and to generate a routine alert when a routine exception exists and to generate an urgent alert when an urgent exception exists.

13. The monitoring system of claim 1 wherein the sensor modules and sensor units are physically attached to elements of the pipeline system, wherein the sensor modules and sensor units are encapsulated and are bonded to the pipeline elements with encapsulating materials and bonding materials that block moisture and corrosive gas from the contact area between the sensor module and sensor unit and the pipeline element whereat each is attached.

14. The monitoring system of claim 1 wherein the sensor unit further includes: a temperature sensor; a strain gage sensor; a natural gas sensor; a gas sensor; and/or a galvanic potential sensor.

15. The monitoring system of claim 14 wherein the one or more servers are configured to process geo-tagged data sensed by the sensors of claim 12 to:

analyze data from the temperature sensor to determine the temperature of the element and/or of the material in the element at a predetermined time and/or at predetermined times, and to compare the analyzed temperature to standardized temperature exception data therefor;

analyze data from the gas sensor and/or the natural gas sensor to determine the presence of gas and/or natural gas and the location thereof, and to compare the analyzed gas and/or natural gas data standardized gas exception data therefor;

analyze data from the strain gage sensor to determine the strain in the element at a predetermined time and/or at predetermined times and to compare the analyzed strain to standardized strain exception data therefor; and/or analyze data from the galvanic potential sensor to determine the galvanic potential at the element at a predetermined time and/or at predetermined times and to compare the analyzed galvanic potential of the element to standardized galvanic potential exception data therefor;

wherein the one or more servers are configured to process results of comparing the analyzed data to standardized exception data to determine when an exception exists at the predetermined time and/or at the predetermined times.

16. A monitoring system for a pipeline system, wherein the pipeline system includes a plurality of elements, the elements thereof including: any one of more of a well, a field, a platform, a derrick, extraction equipment, a plant, a storage tank, a refinery, a chemical plant, a manufacturing facility, as well as associated pipes, pipelines, pumps, pumping stations, valves, conduits, storage containers, and combinations thereof;

the monitoring system comprising:

a multiplicity of thickness sensors disposed adjacent tops and/or bottoms of elements of the pipeline system, including bottoms of storage containers, for measuring the thickness of walls of the pipeline elements, including storage containers, over periods of time;

a multiplicity of vibration sensors disposed adjacent elements of the pipeline system for measuring vibration data at the pipeline elements over periods of time, the vibration data including frequency domain data and time domain data;

plural controller processors wherein each one thereof is coupled to a respective group of sensors, each group of sensors including ones of the multiplicity of thickness sensors and ones of the multiplicity of vibration sensors, each controller processor being configured to receive data sensed by the respective group of sensors coupled thereto;

plural location devices wherein each one thereof is coupled to a respective one of the plural controller processors for providing location data representative of the location thereof and date-time data;

wherein each of the plural controller processors associates the location data and the date-time data thereof with data sensed by the ones of the multiplicity of thickness sensors and the ones of the multiplicity of vibration sensors of its respective group of sensors, whereby the data sensed by the ones of the multiplicity of thickness sensors and the ones of the multiplicity of vibration sensors is geo-tagged;

plural communication devices wherein each one thereof is coupled to a respective one of the plural controllers processors for transmitting the geo-tagged data sensed by the ones of the multiplicity of thickness sensors and the ones of the multiplicity of vibration sensors associated therewith and for receiving control commands; and a central facility comprising:

a communication device for receiving the geo-tagged data from the multiplicity of thickness sensors and from the multiplicity of vibration sensors that is transmitted by the plural communication devices and for transmitting control commands thereto;

one or more servers configured to process the received geo-tagged data from the multiplicity of thickness sensors and from the multiplicity of vibration sensors and to store the received geo-tagged data from the multiplicity of thickness sensors and from the multiplicity of vibration sensors in a relational database;

wherein memory associated with the one or more servers contains the relational database and the geo-tagged sensor data from the multiplicity of thickness sensors and from the multiplicity of vibration sensors stored therein, the memory further containing standardized exception data relating to safe operation of the pipeline system;

wherein the one or more servers are configured to process the geo-tagged data from the multiplicity of thickness sensors and from the multiplicity of vibration sensors to:

analyze data from each of the thickness sensors to determine the thickness of the wall of the element and the rate of change in the thickness thereof as a function of time, and to compare the determined thickness of the wall and the rate of change thereof to standardized thickness exception data therefor;

analyze data from each of the vibration sensors to determine the magnitudes and frequencies and times of vibration at the element and to compare the determined magnitudes and frequencies of the vibration in the frequency domain and/or the determined magnitudes and times thereof in the time domain to standardized vibration exception data therefor;

wherein the one or more servers are configured to process results of comparing the determined data to standardized exception data to determine when an exception exists, and a display and/or human interface device, wherein when an exception exists, the one or more servers generate an alert therefrom and communicate the alert via the display, the human interface device and/or the communication device of the central facility.

17. The monitoring system of claim 16 wherein each of the controller processors is coupled to one or more sensors by a physical electrical conductor or by a wireless communication link.

18. The monitoring system of claim 16 wherein a pipeline element has a top, a bottom and a side:

wherein a first thickness sensor is disposed on top of the pipeline element and a second thickness sensor is disposed on the bottom of the pipeline element; and/or wherein a first thickness sensor is disposed on top of the pipeline element, a second thickness sensor is disposed on the bottom of the pipeline element, and a third thickness sensor is disposed on the side of the pipeline element, whereby corrosion of the pipeline element at it top, at its bottom, and/or at its side is determined from thickness data sensed by the first, second and/or third thickness sensors.

19. The monitoring system of claim 16 wherein each of the location devices includes one or more global positioning system devices including a US GPS system device, a Russian GLONASS system device, a European Galileo system device, an Indian IRNSS system device, or a Chinese BDS system device, or any combination thereof.

20. The monitoring system of claim 16 wherein each of the plural communication devices and the communication device of the central facility communicate via one or more communication networks including a cellular network, satellite communication a Wi-If network, LoRAN, a wireless mesh network, and/or any combination thereof.

21. The monitoring system of claim 16 wherein the one or more servers configured to process the geo-tagged data sensed by the plurality of sensors:

analyze data from the thickness sensors that is geo-tagged at a first plurality of predetermined times to determine a rate of change of wall thickness as a function of time;

analyze data from the vibration sensors that is geo-tagged at a second plurality of predetermined times to determine characteristics of vibration data in the frequency domain to determine vibration-inducing events occurring at a given time and/or over a period of time;

analyze data from the vibration sensors that is geo-tagged at a third plurality of predetermined times to determine characteristics of vibration data in the time domain to determine vibration-inducing events occurring at a given time and/or over a period of time;

wherein the standardized thickness exception data and the standardized vibration exception data have exception data limits for rates of change of thickness and of vibration, respectively; and wherein the one or more servers determine when an exception exists from the rate of change of the data geo-tagged at the first, second and third predetermined times.

22. The monitoring system of claim 16 wherein the one or more servers configured to process the geo-tagged data:

analyze data from the thickness sensors that is geo-tagged at a predetermined time, and/or analyze data from the vibration sensors that is geo-tagged at a predetermined time;

wherein the one or more servers determine when an exception exists therein at the predetermined time.

23. The monitoring system of claim 16 wherein the one or more servers configured to process the geo-tagged data:

analyze data from the thickness sensors that is geo-tagged at the first and second predetermined times, and/or analyze data from the vibration sensors that is geo-tagged at the first and second predetermined times;

wherein the standardized thickness exception data and/or the standardized vibration exception data has an exception data limit for rates of change of thickness and/or of vibration; and wherein the one or more servers determine when an exception exists from the rate of change of the data geo-tagged at the first and second predetermined times.

24. The monitoring system of claim 16 wherein:

the thickness sensor includes an ultrasonic sensor and/or a magnetic sensor; and/or the vibration sensor includes a sound transducer, a shock transducer, a vibration transducer, a vibration transducer, and/or an accelerometer.

25. The monitoring system of claim 16 wherein the standardized exception data relating to safe operation of the pipeline system that is stored in the memory of the central facility includes standardized routine exception data and standardized urgent exception data, wherein the one or more servers are configured to compare the exceptions to the standardized routine exception data and to the standardized urgent exception data when an exception exists, and to generate a routine alert when a routine exception exists and to generate an urgent alert when an urgent exception exists.

26. The monitoring system of claim 16 wherein the sensors are physically attached to elements of the pipeline system, and wherein ones of the sensors are encapsulated and are bonded to the pipeline elements with encapsulating materials and bonding materials that block moisture and corrosive gas from the contact area between the sensor and the pipeline element whereat each is attached.

27. The monitoring system of claim 16 further including: plural temperature sensors; plural strain gage sensors; plural natural gas sensors; plural gas sensors; and/or plural galvanic potential sensors, wherein each one of the foregoing sensors is coupled to one of the plural controller processors.

28. The monitoring system of claim 27 wherein the one or more servers are configured to process geo-tagged data sensed by the sensors of claim 27 to:

analyze data from the temperature sensor to determine the temperature of the element and/or of the material in the element at a predetermined time and/or at predetermined times, and to compare the analyzed temperature to standardized temperature exception data therefor;

analyze data from the gas sensor and/or the natural gas sensor to determine the presence of gas and/or natural gas and the location thereof, and to compare the analyzed gas and/or natural gas data standardized gas exception data therefor;

analyze data from the strain gage sensor to determine the strain in the element at a predetermined time and/or at predetermined times and to compare the analyzed strain to standardized strain exception data therefor; and/or analyze data from the galvanic potential sensor to determine the galvanic potential at the element at a predetermined time and/or at predetermined times and to compare the analyzed galvanic potential of the element to standardized galvanic potential exception data therefor;

wherein the one or more servers are configured to process results of comparing the analyzed data to standardized exception data to determine when an exception exists at the predetermined time and/or at the predetermined times.

29. The monitoring system of claim 16 further comprising:

plural flow sensors for sensing a flow of material in pipeline elements and/or plural leak sensors for detecting leaks of media near to the pipeline elements, each flow sensor and each leak sensor being disposed adjacent to an element of the pipeline;

wherein each of the plural flow sensors and each of the plural leak sensors is coupled to one of the plural controller processors wherein the flow data sensed by each flow sensor and the leak data sensed by each leak detector is geo-tagged, whereby the geo-tagged flow data and the geo-tagged leak data is communicated to the servers of the central facility;

wherein the one or more servers are configured to process the geo-tagged data from the plural flow sensors and from the plural leak sensors to:

analyze data from the flow sensors to determine the direction and velocity of the flow of material in the element and to compare the determined direction and velocity of the flow of material to standardized flow exception data therefor;

analyze conductivity data from the leak sensors to determine the occurrence of a leak of material in the pipeline element and to compare the determined conductivity to standardized conductivity exception data therefor;

wherein the one or more servers are configured to process results of comparing the determined data to standardized exception data to determine when an exception exists, and when an exception exists, the one or more servers generate an alert therefrom and communicate the alert via the display, the human interface device and/or the communication device of the central facility.

30. The monitoring system of claim 29 wherein the one or more servers configured to process the geo-tagged data:

analyze data from the thickness sensors that is geo-tagged at a predetermined time, and/or analyze data from the vibration sensors that is geo-tagged at a predetermined time, analyze data from the flow sensors that is geo-tagged at a predetermined time, and/or analyze data from the leak sensors that is geo-tagged at a predetermined time, wherein the one or more servers determine when an exception exists therein at the predetermined time.

31. The monitoring system of claim 29 wherein the one or more servers configured to process the geo-tagged data:

analyze data from the thickness sensors that is geo-tagged at the first and second predetermined times, analyze data from the vibration sensors that is geo-tagged at the first and second predetermined times, analyze data from the flow sensors that is geo-tagged at first and second predetermined times, and/or analyze data from the flow sensors that is geo-tagged at first and second predetermined times;

wherein the standardized thickness exception data, the standardized vibration exception data, the standardized flow exception data, and/or the standardized leak exception data, have exception data limits for rates of change of thickness, of vibration, of flow and/or of leak, respectively; and wherein the one or more servers determine when an exception exists from the rate of change of the data geo-tagged at the first and second predetermined times.

32. The monitoring system of claim 29 wherein:

the thickness sensor includes an ultrasonic sensor and/or a magnetic sensor;

the vibration sensor includes a sound transducer, a shock transducer, a vibration transducer, a vibration transducer, and/or an accelerometer;

the flow sensor includes an ultrasonic flow sensor; and/or the leak sensor includes two electrical conductors in a material that expands when it absorbs a media carried by the pipeline system.

33. The monitoring system of claim 29 wherein a pipeline element has a top and a bottom, wherein a leak detection cable extends from the leak sensor, and wherein:

the leak detection cable is disposed along the top of the pipeline element when the pipeline element carries a gaseous media; or the leak detection cable is disposed along the bottom of the pipeline element for when the pipeline element carries a liquid media;

a first leak detection cable is disposed along the top of the pipeline element and a second leak detection cable is disposed along the bottom of the pipeline element for when the pipeline element carries a gaseous media and/or a liquid media.

34. The monitoring system of claim 29 wherein a pipeline element has a top and a bottom, wherein the leak sensor includes:

one or more electrical cables each including a plurality of electrical wires, each having a distal end that is disposed adjacent to the top and/or bottom of the pipeline element and having a proximal end that is connected to a respective controller processor or to the distal end of another of the one or more electrical cables, whereby the one or more cables can be daisy-chained to extend the distance between the distal ends thereof and the controller processor; and an electrical conductivity measuring device at the distal end of the cable having a pair of electrical conductors in physical contact within a rubber or rubber-like material that absorbs the media carried in the pipeline element, wherein the pair of electrical conductors break electrical contact when the material absorbs the media, wherein each measuring device is connected to a different one of the plurality of electrical wires of the electrical cable for detecting leaks proximate the respective ends of each electrical wire.

35. The monitoring system of claim 29 wherein the standardized exception data relating to safe operation of the pipeline system that is stored in the memory of the central facility includes standardized routine exception data and standardized urgent exception data, wherein the one or more servers are configured to compare the exceptions to the standardized routine exception data and to the standardized urgent exception data when an exception exists, and to generate a routine alert when a routine exception exists and to generate an urgent alert when an urgent exception exists.

36. The monitoring system of claim 29 wherein the sensors are physically attached to elements of the pipeline system, and wherein ones of the sensors are encapsulated and are bonded to the pipeline elements with encapsulating materials and bonding materials that block moisture and corrosive gas from the contact area between the sensor and the pipeline element whereat each is attached.

* * * * *